United States Patent
Han et al.

(10) Patent No.: US 10,235,036 B2
(45) Date of Patent: Mar. 19, 2019

(54) ELECTRONIC DEVICE AND METHOD FOR CONTROLLING ELECTRONIC DEVICE THEREOF

(71) Applicant: SAMSUNG ELECTRONICS CO., LTD., Suwon-si (KR)

(72) Inventors: Ji-youn Han, Seoul (KR); Ji-gwang Kim, Seoul (KR); Joon-Soo Kim, Seoul (KR); Ji-min Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 15/139,627

(22) Filed: Apr. 27, 2016

(65) Prior Publication Data

US 2017/0068505 A1    Mar. 9, 2017

(30) Foreign Application Priority Data

Sep. 3, 2015 (KR) .................. 10-2015-0125128

(51) Int. Cl.
*G06F 17/00* (2006.01)
*G06F 3/0488* (2013.01)
*G06F 3/0482* (2013.01)
*G06F 17/30* (2006.01)

(52) U.S. Cl.
CPC .......... *G06F 3/0488* (2013.01); *G06F 3/0482* (2013.01); *G06F 3/04883* (2013.01); *G06F 17/30749* (2013.01); *G06F 17/30761* (2013.01); *G06F 2203/04806* (2013.01)

(58) Field of Classification Search
CPC ...... G06F 3/0482; G06F 3/162; G06F 3/0488; G06F 3/048; G06F 3/04883; G06F 17/30749; G06F 17/30769; G06F 17/30772; G06F 17/30761; G06F 2203/04806; G06F 2203/04808; G06F 17/30058; G06F 17/30053; G06F 17/3074
See application file for complete search history.

(56) References Cited

U.S. PATENT DOCUMENTS

| | | | |
|---|---|---|---|
| 8,686,270 B2 | 4/2014 | Eggink et al. | |
| 8,855,798 B2 | 10/2014 | DiMaria et al. | |
| 2010/0131844 A1* | 5/2010 | Wohlert | G06F 17/30029 715/716 |
| 2011/0213475 A1* | 9/2011 | Herberger | G06F 17/30772 700/94 |
| 2012/0072418 A1* | 3/2012 | Svendsen | G06F 17/30749 707/724 |
| 2013/0162569 A1* | 6/2013 | Sudo | G06F 3/04845 345/173 |

\* cited by examiner

*Primary Examiner* — Md S Elahee
*Assistant Examiner* — David Siegel
(74) *Attorney, Agent, or Firm* — Sughrue Mion, PLLC

(57) ABSTRACT

An electronic device and a controlling method thereof are provided. The method of controlling an electronic device includes acquiring user information, determining a plurality of categories regarding a music content to be included in a playlist based on the acquired user information, and providing a playlist including a plurality of music contents based on the determined plurality of categories.

16 Claims, 32 Drawing Sheets

Party Mode

ELECTRONIC DEVICE AND METHOD FOR CONTROLLING ELECTRONIC DEVICE THEREOF

CROSS-REFERENCE TO RELATED APPLICATION

This application claims priority from Korean Patent Application No. 10-2015-0125128, filed in the Korean Intellectual Property Office, on Sep. 3, 2015, the disclosure of which is incorporated herein in its entirety by reference.

BACKGROUND

1. Field

Apparatuses and methods consistent with exemplary embodiments relate to an electronic device and a method for controlling the electronic device thereof, and more particularly, to an electronic device which provides a music content based on category information and a method for controlling the electronic device thereof.

2. Description of the Related Art

A related art electronic device which reproduces a music content provides only limited control functions related to the music content through a remote controller or a manipulation button on the electronic device, such as playing or stopping the music content, switching to another music content, controlling a volume, etc. In addition, the related art electronic device provides a music content which is stored in the electronic device or in a storage medium (for example, a compact-disc (CD), a digital versatile disc (DVD), a cassette tape, etc.) accessed by the electronic device. However, with the development of communication technology, an electronic device becomes capable of streaming a music content which is stored in an external server. In other words, a user may be provided with almost infinite numbers of music contents by using the communication technology.

However, since the number of music contents that are available to the user increases, a user may have difficulty in finding a desired music content. That is, a user may need to search for and find a desired music content each time, which causes inconvenience. Also, to share the searched music content with an external audio device, the user needs to transmit information regarding the searched music content to the external audio device, which causes inconvenience.

SUMMARY

One or more exemplary embodiments provide an electronic device, which selects a plurality of music contents according to a category which is determined based on user information and provides a playlist including the selected music contents, and a method for providing the electronic device thereof.

According to an exemplary embodiment, there is provided a method of controlling an electronic device including acquiring user information, determining a plurality of categories regarding a music content to be included in a playlist based on the acquired user information, and providing a playlist including a plurality of music contents based on the determined plurality of categories.

The providing may include displaying a plurality of circular UI elements corresponding to each of the plurality of categories, in response to a user interaction regarding at least one of the plurality of circular UI elements being sensed, generating a category map by adjusting at least one of a location and a size of the at least one circular element according to the user interaction, and determining a ratio of a category regarding a music content to be included in the playlist according to a size ratio of each of the plurality of circular UI elements included in the category map.

The method further include, in response to at least two circular UI elements from among the plurality of circular UI elements being overlapped with each other, determining a ratio of a music content which belongs to all categories corresponding to the at least two circular UI elements to be as much as a ratio of the overlapped area.

The adjusting may include adjusting a location of a circular UI element through a drag interaction of touching one point of the circular UI element and dragging the touched point to another point, and adjusting a size of a circular UI through a pinch-out interaction of touching two points on the circular UI and widening a distance between the two points or a pinch-in interaction of touching two points of the circular UI and narrowing a distance between the two points.

The providing may include transmitting information regarding the category map to an external server, receiving a playlist which is generated based on the information regarding the category map from the external server, and providing the received playlist.

The method may further include transmitting information regarding the category map to an external audio device, and the external audio device may generate a playlist based on the information regarding the category map.

The playlist which is generated based on the information regarding the category map may be determined differently from the electronic device according to a service or a sound source provider supported by the external audio device.

The providing may include, in response to a predetermined user interaction regarding one area of the category map being sensed, providing a playlist based solely on category information corresponding to the one area.

The method may further include acquiring circumstantial information, and the determining may include adding a category regarding a music content to be included in a playlist based on the circumstantial information.

The method may further include receiving a user command to determine a category, and the determining may include adding a category regarding a music content to be included in the playlist based on the input user command.

According to an exemplary embodiment, there is provided an electronic device including a display, a sensor configured to sense a user interaction, and a controller configured to acquire user information, determine a plurality of categories regarding a music content to be included in a playlist based on the acquired user information, and control the display to provide a playlist including a plurality of music contents based on the determined plurality of categories.

The controller may control the display to display a plurality of circular UI elements corresponding to each of the plurality of categories, and in response to a user interaction regarding at least one of the plurality of circular UI elements being sensed, generate a category map by adjusting at least one of a location and a size of the at least one circular element according to the user interaction, and determine a ratio of a category regarding a music content to be included in the playlist according to a size ratio of each of the plurality of circular UI elements included in the category map.

The controller, in response to at least two circular UI elements from among the plurality of circular UI elements being overlapped with each other, may determine a ratio of a music content which belongs to all categories corresponding to the at least two circular UI elements to be as much as a ratio of the overlapped area.

The controller may adjust a location of a circular UI element through a drag interaction of touching one point of the circular UI element and dragging the touched point to another point, and adjust a size of a circular UI through a pinch-out interaction of touching two points on the circular UI and widening a distance between the two points or a pinch-in interaction of touching two points of the circular UI and narrowing a distance between the two points.

The device may further include a communicator configured to perform communication with an external server, and the controller may control the communicator to transmit information regarding the category map to an external server and receive a playlist which is generated based on the information regarding the category map from the external server, and control the display to provided the received playlist.

The device may further include a communicator configured to perform communication with an external audio device, controlling the communicator to transmit information regarding the category map to an external device, and the external audio device may generate a playlist based on the information regarding the category map.

The playlist which is generated based on the information regarding the category map may be determined differently from the electronic device according to a service or a sound source provider supported by the external audio device.

The controller, in response to a predetermined user interaction regarding one area of the category map being sensed, may provide a playlist based solely on category information corresponding to the one area.

The controller may acquire circumstantial information, and add a category regarding a music content to be included in a playlist based on the circumstantial information.

The controller, in response to a user command to determine a category being input, may add a category regarding a music content to be included in the playlist based on the input user command.

According to an exemplary embodiment, there is provided a method of controlling an audio device including receiving information regarding a user's preferred category from outside, generating a playlist including a plurality of music contents based on the acquired information regarding the preferred category, and playing a music content based on the generated playlist.

According to an exemplary embodiment, there is provided an audio device including a communicator configured to perform communication with an external device, an audio output unit configured to play a music content, and a controller configured to acquire information regarding a user's preferred category from an external device through the communicator, generate a playlist including a plurality of music contents based on the acquired information regarding the preferred category, and control the audio output unit to play a music content based on the generated playlist.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
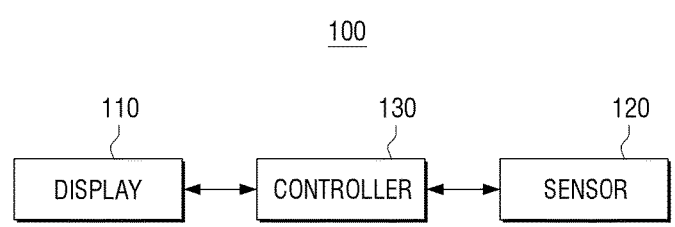
FIG. 1 is a block diagram illustrating a configuration of an electronic device according to an exemplary embodiment.

Certain exemplary embodiments will now be described in greater detail with reference to the accompanying drawings.

The terms used in the exemplary embodiments of the present disclosure are general terms which are widely used now and selected considering the functions of the present disclosure. However, the terms may vary depending on the intention of a person skilled in the art, a precedent, or the advent of new technology. In addition, in a specified case, the term arbitrarily selected by the applicant may be used. In this case, the meaning of the term will be explained in the corresponding description of the invention. Therefore, the terms used in the present disclosure should be defined based on the meanings of the terms and the descriptions made herein, rather than the names of the terms.

The exemplary embodiments may vary, and may be provided in different exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the invention, the specific description is omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

It will be understood that, when an element is "connected" with another element, the element may be "directly connected" with another element, and also, the element may be "electrically connected" with another element with an intervening element therebetween. In addition, it will be understood that, when a certain part "includes" a certain element, the certain part may not exclude another element and may further include another element unless this term is defined otherwise.

Hereinafter, the exemplary embodiments of the present disclosure will be described in greater detail with reference to the accompanying drawings, so that a person skilled in the art can easily implement the exemplary embodiments. The exemplary embodiments may, however, be embodied in many different forms and should not be construed as limited to the exemplary embodiments set forth herein. In addition, illustration of parts having nothing to do with the explanation of the present disclosure is omitted from the drawings to clearly explain the present disclosure. Throughout the specification, similar reference numerals are used for similar elements.

In addition, in the exemplary embodiments of the present disclosure, a user interaction is an operation of a user to control an electronic device, and may include at least one of a touch interaction, a bending interaction, a voice interaction, a button interaction, and a motion interaction, but is not limited thereto. Further, a user interaction may be used as the same meaning as a user sensing and a user manipulation.

In addition, in the exemplary embodiments of the present disclosure, the "touch interaction" may include a touch gesture which is performed by a user on a display and a cover to control a device. In addition, the "touch interaction" may include a touch which is not performed in contact with the display and is performed at a predetermined distance or more from the display (for example, floating or hovering). The touch sensing may include, but not limited to, a touch and hold gesture, a tap gesture of lightly touching and then releasing the touch, a double tap gesture, a panning gesture, a flick gesture, a touch and drag gesture of touching and then moving a touched point in one direction while maintaining a touch, a pinch gesture, etc.

In addition, in the exemplary embodiments of the present disclosure, the "button sensing" refers to a user's sensing a device using a physical button attached to a device or a remote controller to control the device.

In addition, in the exemplary embodiments of the present disclosure, a User Interaction (UI) element refers to an element which allows a user interaction and provides a feedback such as visual, auditory and olfactory feedback according to a user sensing.

FIG. 1 is a block diagram illustrating a configuration of an electronic device 100 according to an exemplary embodiment. As illustrated in FIG. 1, the electronic device 100 includes a display 110, a sensor 120 and a controller 130. The electronic device 100 according to an exemplary embodiment may be realized as an audio device with a display, but this is only an example. The electronic device 100 may be realized as various electronic devices such as a smart phone, a tablet personal computer (PC), a smart television (TV), etc.

The display 100 outputs image data. In particular, the display 100 may provide a category map including a plurality of user interface (UI) elements corresponding to a plurality of categories. For example, the UI elements may respectively have a circular shape. However, the exemplary embodiments are not limited thereto and the UI elements may be provided in various forms including a square, a triangle, etc.

The sensor 120 senses a user interaction with respect to the electronic device 100. In particular, the sensor 120 senses a user interaction regarding a UI element. In this case, the user interaction may be a touch interaction of touching the display 110, but is not limited thereto.

The controller 130 controls the overall operations of the electronic device 100. In particular, the controller 130 may acquire user information, determine a plurality of categories regarding a music content to be included in a playlist based on the acquired user information, and control the display 110 to provide the playlist including a plurality of music contents based on the determined plurality of categories.

Specifically, the controller 130 acquires user information. In particular, the controller 130 may acquire user information such as information regarding a music content that is frequently reproduced, information regarding the user's preference input by the user, information regarding a keyword frequently used by the user as a search query, etc. In this case, the controller 130 may acquire user information through various data stored in the electronic device 100, but this is only an example. The controller 130 may receive information from an external server.

The controller 130 may determine a plurality of categories regarding a music content to be included in a playlist based on the acquired user information. Specifically, the controller 130 may determine a category of music contents which are to be included in a playlist based on various user information as described above. For example, the category may include at least one of a genre of music contents, time of release of the music contents, a name of an artist (e.g., a singer) of the music contents, and the mood of the music contents.

The controller 130 may control the display 110 to provide a playlist including a plurality of music contents based on the determined plurality of categories.

According to an exemplary embodiment, the controller 130 may search for music contents corresponding to the determined plurality of category information from among pre-stored music contents in the electronic device 100 or music contents stored in an external server and provide the music contents to a user. For example, if the determined plurality of categories of the music contents include a genre "Hip Hop" and an artist "Big Bang", the controller 130 may search for a music content of which the genre is hip hop and the related artist is Big Bang and provide the music content to a user. In this case, the controller 130 may provide a playlist including music contents corresponding to the determined category information from among music contents stored in the electronic device 100, but this is only an example. The controller 130 may transmit category information to an external server and receive a playlist including music contents corresponding to the category information from the external server.

According to another exemplary embodiment, the controller 130 may control the display 110 to display a plurality of UI elements (e.g., UI elements having a circular shape) corresponding to each of a plurality of categories. For example, if the determined plurality of categories include a genre "Hip Hop" and an artist "Big Bang", the controller 130 may control the display 110 to display a first UI element corresponding to the category of "Hip Hop" and a second UI element corresponding to the category of "Big Bang".

If a user interaction regarding at least one of a plurality of UI elements is sensed through the sensor 120, the controller 130 may generate a category map by adjusting at least one of a location and a size of at least one UI element according to the user interaction. Specifically, if the drag interaction of touching one point of a UI element and dragging the touched point to another point is sensed, the controller 130 may adjust the location of the UI element. If a pinch-out interaction of touching two points of a UI element and widening a distance between the two points or a pinch-in interaction of touching two points of a UI element and narrowing the distance between the two points is sensed, the controller 130 may adjust the size of the UI element. The controller 130 may generate a category map including a plurality of UI elements of which size and/or location are adjusted.

The controller 130 may determine a ratio of a category regarding music contents which are to be included in a playlist according to a ratio between sizes of a plurality of UI elements included in a category map. In this case, if at least two UI elements from among the plurality of UI elements are overlapped with each other, the controller 130 may determine the ratio of a music content which belongs to all of categories corresponding to the at least two UI elements to entire music contents to be included in a playlist to be correspond to the ratio of the size of the overlapped area to the entire size of the plurality of UI elements. The controller 130 may control the display 110 to provide a playlist including a plurality of music contents according to the determined ratio of the music content.

The controller 130 may transmit information regarding a category map through a communicator to an external server and receive a playlist which is generated based on the information regarding a category map from the external server. The controller 130 may control the display 110 to provide the received playlist.

The controller 130 may transmit the information regarding the category map to an external audio device through a communicator. If the information regarding the category map is received by the external audio device, the external audio device may generate a playlist based on the information regarding the category map. In this case, the playlist which is generated based on the information regarding the category map may be determined differently from a playlist generated by an electronic device according to a service or a sound source provider which is supported by the external audio device. In an exemplary embodiment, by sharing the category map between the electronic device and the external audio device, a music content that is determined to be preferred by the user may be recommended to another user.

If a predetermined user interaction regarding one area of the category map is sensed, the controller 130 may control the display 110 to provide a playlist based solely on category information corresponding to the one area where the user interaction is sensed.

In the above exemplary embodiment, it is described that a UI element included in the category map is generated by user information, but this is only an example. A UI element may be added to the category map according to another information or a user input. Specifically, the controller 130 may acquire circumstantial information and add a category regarding a music content to be included in a playlist based on the circumstantial information. In this case, the circumstantial information may include information on a circumstance around the electronic device, for example, weather information, time information, ambient brightness information, location information, noise information, etc. In addition, when a user command to determine a category is input, the controller 130 may add a category regarding music contents to be included in a playlist based on the input user command.

Hereinafter, the above described operation according to exemplary embodiments will be described in greater detail with reference to FIGS. 2 to 13.

Figure 2:
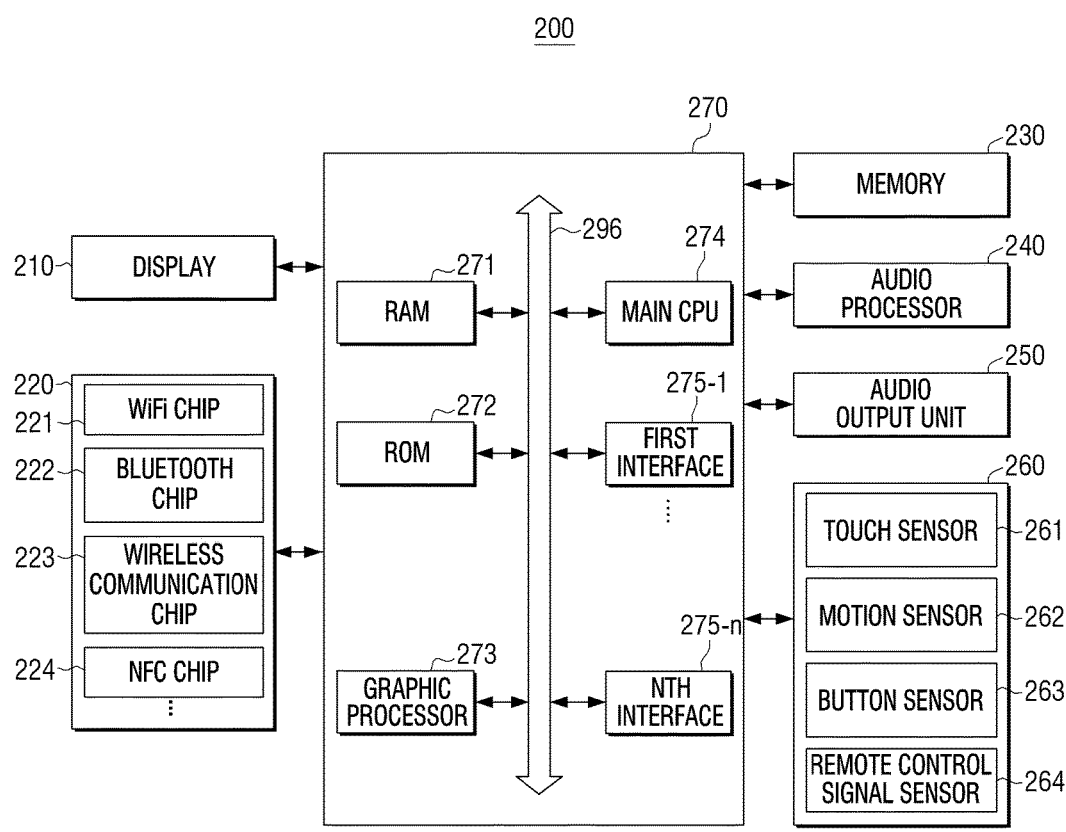
FIG. 2 is a block diagram illustrating a configuration of an electronic device according to an exemplary embodiment.

FIG. 2 is a block diagram illustrating a configuration of an electronic device 200 according to an exemplary embodiment.

As illustrated in FIG. 2, the electronic device 200 may include a display 210, a communicator 220, a memory 230, an audio processor 240, an audio output unit 250, a sensor 260, and a controller 270. The configuration of the electronic device 200 illustrated in FIG. 2 is only an example, and is not limited thereto. Accordingly, a part of the configuration of the electronic device 200 illustrated in FIG. 2 may be omitted or changed, or another part may be added according to the type or purpose of the electronic device 200.

The display 210 may display various screens or UIs on a display area. In particular, the display 210 may display a category map including a plurality of UI elements (e.g., circular UI elements) corresponding to a plurality of categories which are determined by user information, circumstantial information, and/or a user input. In this case, the plurality of UI elements may be provided in the form of a circle, but this is only an example. The plurality of UI elements may be provided in various forms including a square, a triangle, etc. In addition, the name of the category corresponding to a plurality of UI elements may be displayed.

The display 210 may be provided in various sizes. For example, the display 210 may be provided in various sizes such as having a width of 3 inches, 4 inches, 4.65 inches, 5 inches, 6.5 inches, 8.4 inches, etc. The display 210 may include a plurality of pixels. In this case, the resolution may be represented by the number of pixels in the horizontal direction multiplied by the number of pixels in the vertical direction. For example, the display 210 may have the resolution of 320×320, 360×480, 720×1280, 1280×800, or 3940×2160.

The display 210 may be realized as a display panel in various forms. For example, the display panel may be realized with various display technologies such as a liquid crystal display, an organic light emitting diodes (OLED), an active-matrix organic light-emitting diode (AM-OLED), a liquid crystal on silicon (LcoS), a digital light processing (DLP), etc.

The display 210 may be coupled with at least one of a front region, a side region, and a back region of the electronic device 200 in a flexible display form. The flexible display may be warped, bent, or rolled without any damage due to a thin and flexible substrate like paper. The flexible display may also be manufactured using a generally used glass substrate and a plastic substrate. In the case of using the plastic substrate, to prevent the substrate from being damaged, the flexible display may be manufactured using a low-temperature manufacturing process instead of using the existing manufacturing process. Further, by replacing the glass substrate enclosing a flexible liquid crystal with a plastic film, the flexible display may be flexibly folded and unfolded. The flexible display may be thin, light, and strong against impact, may be warped or bent, and may be manufactured in various forms.

The display 210 is coupled with a touch sensor 211 and thus may be implemented as a touch screen having a layer structure. The touch screen may have a display function and a function of detecting a touch input position, a touched area, and a touch input pressure and may have the function of detecting a real-touch and a proximity touch.

The communicator 220 performs communication with various types of external devices according to various types of communication methods. The communicator 220 may include at least one of a wireless-fidelity (Wi-Fi) chip 221, a Bluetooth chip 222, a wireless communication chip 223, and a near field communication (NFC) chip 224. The controller 270 may perform communication with an external server or various external devices using the communicator 220.

In particular, the WiFi chip 221 and the Bluetooth chip 222 may perform communication using a WiFi method and a Bluetooth method, respectively. When the WiFi chip 221 or the Bluetooth chip 222 is used, a variety of connectivity information such as a service set identifier (SSID) and a session key may be first exchanged between the external device and the electronic device 200, and communication is established between the external device and the electronic device 200 using the connectivity information, and a variety of information may be transmitted and received via established communication.

The wireless communication chip 223 refers to a chip which performs communication according to various communication standards such as IEEE, Zigbee, $3^{rd}$ generation (3G), $3^{rd}$ generation partnership project (3GPP), long term evolution (LTE), etc. The NFC chip 224 refers to a chip which operates in an NFC method using a band of 13.56 MHz from among various frequency bands of radio frequency identification (RFID) such as 135 kHz, 13.56 MHz, 433 MHz, 860~960 MHz, 2.45 GHz, etc.

In particular, the communicator 220 may transmit information regarding the category map to an external server and receive a playlist which is generated based on the information regarding the category map from the external server.

In addition, the communicator 220 may transmit information regarding the category map to an external audio device and receive information regarding the category map from the external audio device.

The memory 230 may store various programs and data to operate the electronic device 200. The storage 230 may be implemented as a non-volatile memory, a volatile memory, a flash memory, a hard disk drive (HDD), a solid state drive (SSD), etc. The storage 230 is accessed by the controller 270 and operations such as reading, recording, modification, deletion, update, etc., of data may be performed by the controller 270. In an exemplary embodiment, the term 'memory' may include a read only memory (ROM) 272 within the controller 270, or a memory card (not illustrated) (for example, a micro secure digital (SD) card, a memory stick) equipped in the electronic device 200. Further, the memory 230 may include a buffer which temporarily stores various data of music contents.

In addition, the memory 230 may store programs and data to configure various screens to be displayed on a display area of the display 210.

Figure 3:
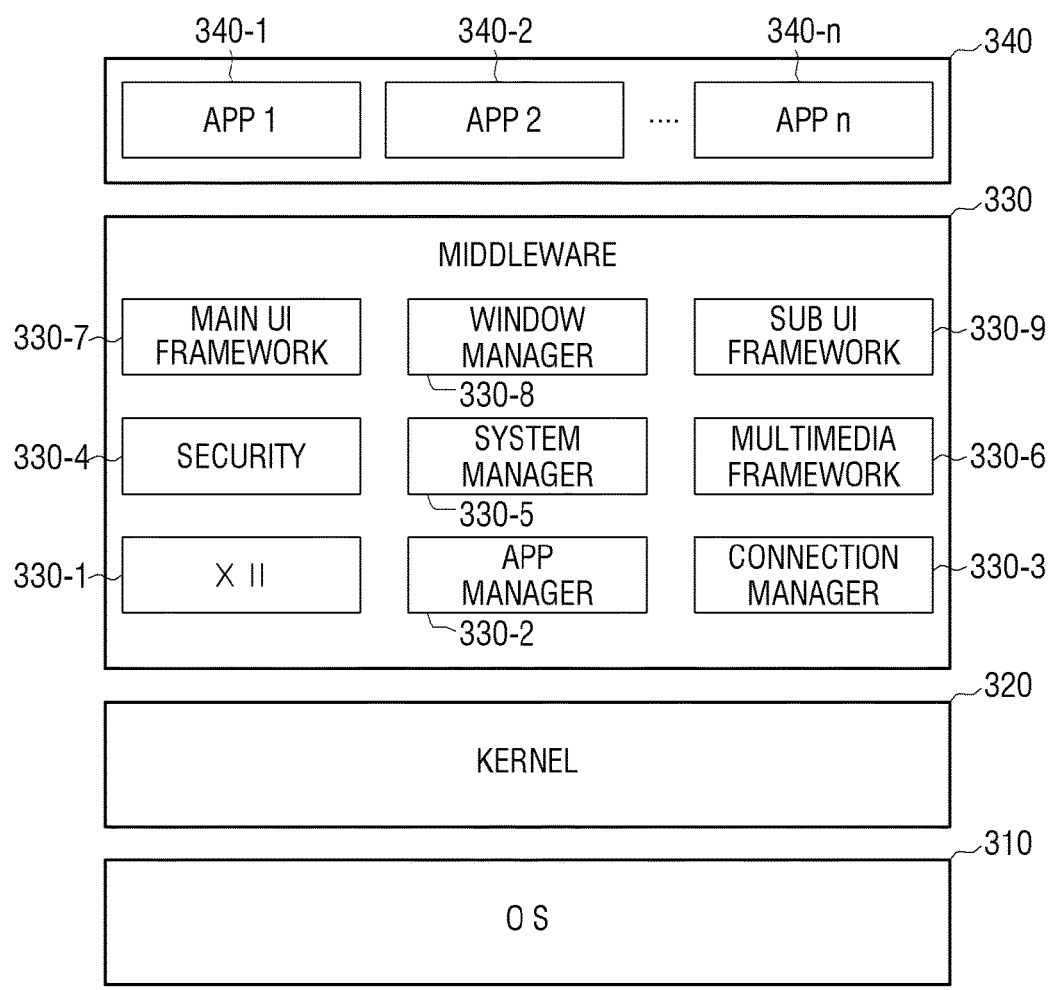
FIG. 3 is a block diagram illustrating software which is stored in a memory according to an exemplary embodiment.

Hereinafter, the structure of software stored in the memory 230 will be described with reference to FIG. 3. Referring to FIG. 3, the memory 230 may store software including an operating system (OS) 310, a kernel 320, middleware 330, an application 340, etc.

The OS 310 serves to control and manage the overall operations of hardware of the electronic device 200. That is, the OS 310 is in charge of basic functions such as hardware management, memory, security, etc.

The kernel 320 serves as a path through which various signals in addition to a touch signal, etc., sensed by the sensor 260 are transferred to the middleware 330.

The middleware 330 includes various software modules for controlling the operation of the electronic device 200. Referring to FIG. 3, the middleware 330 includes an X 11 module 330-1, an APP manager 330-2, a connection manager 330-3, a security module 330-4, a system manager 330-5, a multimedia framework 330-6, a main UI framework 330-7, a window manager 330-8, and a sub UI framework 330-9.

The X 11 module 330-1 is a module that receives various event signals from various hardware included in the display apparatus 200. Here, the event may include various events such as an event in which a user gesture is sensed, an event in which a system alarm is generated, an event in which a specific program is executed or ended, etc.

The APP manager 330-2 is a module that manages an execution state of various applications 340 installed in the memory 230. When an event is sensed from the X 11 module 330-1, the APP manager 330-2 calls and executes an application corresponding to the event.

The connection manager 330-3 is a module that supports a wired and/or wireless network connection. The connection manager 330-3 may include various detailed modules such as a DNET module and a universal plug and play (UPnP) module.

The security module 330-4 is a module that supports certification, permission, secure storage for hardware, etc.

The system manager 330-5 monitors a state of each component within the electronic device 200 and provides monitored results to other modules. For example, when a residual battery is insufficient (e.g., lower than a threshold), an error occurs, or a communication connection state is not normal, etc., the system manager 330-5 may provide the monitored results to the main UI framework 330-7 or the sub UI framework 330-9 to output a notification message or a notification sound.

The multimedia framework 330-6 is a module that plays multimedia contents which are stored in the electronic device 200 or provided from external sources. The multimedia framework 330-6 may include a player module, a camcorder module, a sound processing module, and the like. Therefore, the multimedia framework 330-6 may perform an operation of playing various multimedia contents to generate and play an image content and/or an audio content.

The main UI framework 330-7 is a module that provides various UIs to be displayed in a main region of the display 210, and the sub UI framework 330-9 is a module that provides various UIs to be displayed in a sub region of the display 210. The main UI framework 330-7 and the sub UI framework 330-9 may include a video compositor module that configures various UI elements, a coordinate compositor that determine s coordinates at which a UI element is displayed, a rendering module that renders the configured UI element at the determined coordinates, a two dimensional (2D) and/or three dimensional (3D) UI toolkit that provides a tool for configuring a 2D and/or 3D type of the UI, etc.

The window manager 330-8 may sense a touch event by a user's body or a pen or other input events. When the events are sensed, the window manager 330-8 transfers an event signal to the main UI framework 330-7 or the sub UI framework 330-9 to perform an operation corresponding to the event.

In addition, various program modules such as a handwriting module that draws a line according to a drag trajectory, an angle determination module for determining a pitch angle, a roll angle, a yaw angle, etc., based on sensor values sensed by a motion sensor 262 may also be stored in the electronic device 200.

The application module 340 includes applications 340-1 to 340-n to support various functions. For example, the application module 340 may include program modules that provide various services such as a navigation program module, a game module, an e-book module, a calendar module, an alarm management module, and a music playing module. The applications may be installed as a default and may be arbitrarily installed and used by a user in use. If the UI element is selected, a main central processing unit (CPU) 274 may execute an application corresponding to the selected UI element using the application module 340.

The structure illustrated in FIG. 3 is only an example, and therefore the exemplary embodiments are not limited thereto. Some of the components of the electronic device 200 may be omitted, changed, or added according to a kind of the electronic device 200 or a purpose of the electronic device 200. For example, the memory 230 may additionally store various programs such as a sensing module that analyzes signals sensed by various sensors, a messaging module of a messenger program, a text message program, an e-mail program, etc.; a call information aggregator program module, a VoIP module, and a web browser module.

Referring back to FIG. 2, the audio processor 240 processes audio data of an image content. The audio processor 240 may perform various processing with respect to audio data such as decoding, amplification, noise filtering, etc. The audio data processed by the audio processor 240 may be output to the audio output unit 250.

The audio output unit 250 outputs not only various audio data for which various processing such as decoding, amplification and noise filtering is performed by the audio processor 240 but also various notification sounds or voice messages. In particular, the audio output unit 250 may be realized as a speaker, but this is only an example. The audio output unit 250 may be realized as an output terminal which is capable of outputting audio data.

The sensor 260 senses various user inputs. In addition, the sensor 260 may sense at least one of various changes such as a position change, an illuminance change, and an acceleration change of the electronic device 200 and transmit an electrical signal corresponding thereto to the controller 270. In other words, the sensor 260 may sense a state change of the electronic device 200, generate a sensing signal in response to the state change, and transmit the generated sensing signal to the controller 270.

According to an exemplary embodiment, the sensor 260 may include various sensors and when the electronic device 200 is driven (or based on user setting), at least one sensor set according to a control of the sensor 260 may be supplied with power to sense the state change of the electronic device 200. In this case, the sensor 260 may include various sensors and may be configured to include at least one of any possible types of sensing devices capable of detecting the state change of the electronic device 200. For example, the sensor 260 may be configured to include at least one sensor of various sensing devices such as a touch sensor, an acceleration sensor, a gyro sensor, an illuminance sensor, a proximity sensor, a pressure sensor, a noise sensor (for example, microphone), a video sensor (for example, camera module or camera), a pen sensing sensor, a timer, etc.

The sensor 260 may include, but is not limited to, a touch sensor 261, the motion sensor, a button sensor 263, a remote control signal sensor 264, etc. according to various purposes.

There is no physical restriction to a type of a sensor included in the sensor 260, and one or more sensors may be combined to serve as the sensors 261 to 264. In addition, according to an implementation method, the configuration of the sensor 260 or a part of the functions of the sensor 260 may be included in the controller 270.

The touch sensor 261 may sense a user's finger input and output a touch event value corresponding to the sensed touch signal. The touch panel of the touch sensor 261 may be mounted at a lower portion of the display 210 (e.g., below or under a display panel of the display 210). The touch sensor 261 that senses the user's finger input may include a touch sensor of, for example, a capacitive type and a resistive type. The capacitive type touch sensor senses micro electricity generated by a user's body to determine touch coordinates. The resistive type touch sensor includes two electrode plates embedded in the touch panel and determines touch coordinates by sensing a flow of current due to a contact between upper and lower plates at a touched point.

The touch sensor 261 may acquire an output signal depending on a user input from the touch sensor. The touch sensor 261 may determine user input information, such as a touch position, a touch coordinate, a touch number, touch strength, a cell identification (ID), a touch angle, and a touch area, from signal values and determine a kind of a touch input based on the determined user input information. In this case, the touch sensor 261 may determine a kind of touch input based on touch recognition algorithm, touch pattern data, etc. in the memory (not illustrated) of the touch panel. When the kind of touch input is determined, the touch sensor 261 may transmit information on the kind of touch input to the controller 270. The touch sensor 261 may sense the proximity touch position (or hovering position) input by the user.

In this case, the controller 270 may perform some of the above described functions of the touch sensor 261. For example, the touch sensor 261 may transmit the signal value acquired from the touch sensor or the user input information determined based on the signal value to the controller 270. The controller 270 may determine the kind of touch input using the received signal value or user input information, the touch recognition algorithm, the touch pattern data, etc., which are stored in the memory 230.

The motion sensor 262 may sense the motion of the electronic device 200 (for example, a rotating motion, a tilting motion, etc.) using at least one of an acceleration sensor, a tilt sensor, a gyro sensor, and a 3-axis magnetic sensor. In addition, the motion sensor 262 may transmit a generated electrical signal to the controller 270. For example, the motion sensor 262 may measure acceleration of the electronic device 200 added with acceleration of motion and gravity, or may measure only the acceleration of gravity when there is no motion detected in the electronic device 200.

For example, assuming that the motion sensor 262 uses an acceleration sensor, gravitational acceleration with respect to an x-axis, a y-axis and a z-axis with reference to the electronic device 200 may be measured. In this case, it is assumed that when a front surface of the electronic device 100 is placed to face upward, the gravitational acceleration is in a positive (+) direction, and when a rear surface of the electronic device 100 is placed to face upward, the gravitational acceleration is in a negative (−) direction.

For example, when the electronic device 200 is placed with its front surface facing upward, the gravitational acceleration of the electronic device 200 is measured by the motion sensor 262 such that the X-axis and Y-axis components are measured as 0 m/sec$^2$, and the Z-axis component is measured as a specific positive value (for example, +9.8 m/sec$^2$). On the other hand, when the electronic device 200 is placed with its rear surface facing upward, the gravitational acceleration of the electronic device 200 is measured by the motion sensor 262 such that the X-axis and Y-axis components are measured as 0 m/sec$^2$, and the Z-axis component is measured as a specific negative value (for example, −9.8 m/sec$^2$). In addition, when the electronic device 200 is placed obliquely with respect to a surface of a table, the gravitational acceleration of the electronic device 200 is measured by the motion sensor 262 such that at least one axis component is measured as a value other than 0 m/sec$^2$. In this case, the square root of a sum of squares of the three axis components, that is, the vector sum, may be a specific value (for example, 9.8 m/sec$^2$).

In the above example, the motion sensor 262 may sense the acceleration for each of the X-axis, Y-axis, and Z-axis directions on the coordinate system. It should be noted that the axes and gravitational acceleration corresponding to the axes may be changed according to a location to which a sensor is attached.

The button sensor 263 may sense a user interaction of selecting a button on the electronic device 200. In addition, the remote control signal sensor 264 may sense a signal corresponding to the button selected by the user from among buttons on an external remote controller.

In addition, the sensor 260 may further include a pen sensor (for example, a pen recognition panel) (not illustrated). The pen sensor may sense a user's pen input according to the use of a touch pen (for example, a stylus pen, a digitizer pen, etc.), and output a pen proximity event value or a pen touch event value. The pen sensor may be implemented as, for example, an electromagnetic resonance (EMR) scheme and may sense a touch or a proximity input depending on a change in strength of an electric field due to the proximity or touch of the pen.

In detail, the pen recognition panel may be configured to include an electromagnetic induction coil sensor having a grid structure and an electronic signal processor providing an alternating signal having a predetermined frequency to each loop coil of the electromagnetic induction coil sensor. If a pen having a resonance circuit embedded therein is present around the loop coil of the pen recognition panel, a magnetic field transmitted from the corresponding loop coil generates a current based on mutual electromagnetic induction to the resonance circuit within the pen. Based on the current, the induction magnetic field is generated from a coil included in the resonance circuit within the pen and the pen recognition panel may detect the induction magnetic field from the loop coil in the signal receiving state to sense an approach or a touch of the pen on the pen recognition panel.

A microphone (not illustrated) may receive a user voice (for example, 'start photographing', 'stop photographing', 'finish photographing', or the like) for controlling a medical device using the electronic device 200, and recognize a user voice through a voice recognition module. Subsequently, the microphone may transmit the recognition result to the controller 270. In this case, the voice recognition module may be positioned on part of the controller 270 or outside the electronic device 200.

The controller 270 (or a processor) may control the overall operations of the electronic device 200 using various programs stored in the memory 230.

The controller 270 may be configured to include a random access memory (RAM) 271, a read only memory (ROM) 272, a graphic processor 273, a main CPU 274, first to nth interfaces 275-1~275-n, and a bus 296. In this case, the RAM 271, the ROM 272, the graphic processor 273, the main CPU 274, the first to the nth interfaces 275-1~275-n, etc. may be connected to each other via the bus 296.

The RAM 271 stores O/S and application programs. In detail, if the electronic device 200 is booted, the O/S may be stored in the RAM 271 and various application data selected by the user may be stored in the RAM 271.

The ROM 272 stores a set of commands for system booting. If a turn on command is input and thus power is supplied, the main CPU 274 copies the O/S stored in the memory 230 to the RAM 271 and executes the O/S, according to the command stored in the ROM 271, thereby booting the system. If the booting is completed, the main CPU 274 copies various application programs stored in the memory 230 to the RAM 271 and executes the application programs copied to the RAM 271, to perform various operations.

The graphic processor 273 uses an operator (not illustrated) and a renderer (not illustrated) to generate a screen including various objects such as an item, an image, and a text. Here, the operator may be a component that determines attribute values, such as coordinate values, forms, sizes, and colors by which each object is displayed, according to a layout of the screen, based on the control instruction received from the sensor 260. Further, the renderer may be a component that generates a screen of various layouts including an object based on the attribute values determined by the operator. The screen generated by the renderer may be displayed in a display region of the display 210.

The main CPU 274 accesses the memory 230 to perform booting using the O/S stored in the memory 230. Further, the main CPU 274 performs various operations using various programs, contents, data, and the like which are stored in the memory 230.

The first to nth interfaces 275-1 to 275-n are connected to the foregoing various components. One of the first to nth interfaces 275-1 to 275-n may also be a network interface which is connected to the external device through a network.

In particular, the controller 270 may acquire user information, determine a plurality of categories regarding music contents to be included in a playlist based on the acquired user information, and control the display 210 to provide a playlist including a plurality of music contents based on the determined plurality of categories.

Specifically, the controller 270 may acquire various user information. In particular, the controller 270 may acquire metadata information regarding a music content that is frequently reproduced, information regarding a keyword frequently used as a search query, information regarding the user's favorite genre, singer, etc.

For example, when a music content is reproduced, the controller 270 may store information about a frequency at which the music content is reproduced. In addition, the controller 270 may store information regarding a music content which is played a predetermined number of times (for example, ten times) from among music contents that have been reproduced. In other words, the controller 270 may store information regarding the user's preferred music contents. In this case, the information regarding the user's preferred music content may include metadata information such as genre information, singer information, mood information, information on time of release, etc.

In addition, the controller 270 may store information regarding a keyword which is frequently searched for by a user. For example, if a user searches Internet using a specific keyword, the controller 270 may store information regarding a keyword which is used more than a predetermined number of times (for example, five times) from among specific keywords which are used for Internet search. In particular, the controller 270 may extract and store a keyword which is related to a music content from among keywords which are used more than a predetermined number of times.

The controller 270 may directly or indirectly acquire a user's preferred information by a user input. Specifically, the controller 270 may acquire various information such as the user's preferred singer, genre, mood, etc. which are pre-stored by a user input.

The controller 270 may determine a plurality of categories regarding music contents to be included in a playlist based on the acquired user information. In this case, the plurality of categories may include the genre of a music content, the time of release of a music content, the name of the singer of a music content, the mood of a music content, a user activity that may relate to a music content, etc. For example, the genre of a music content may include dance, jazz, new age, hip hop, ballad, classic, rock, etc. A music content corresponding to the information regarding the time of release of a music content may include a music content of 80's, a music content of 90's, a music content of 2000's, a music content of 2010's, a recent music content, an old pop song, etc. The singer of a music content may include group singers, solo singers, singers whose name start with A~G, singers whose name start with H~M, etc. The mood of a music content may include light, chill, stylish, good, dreamy, energetic, melancholic, etc. In addition, a category regarding a music content corresponding to a user activity may include a music content that ma relate to a user activity such as cooking, studying, party, working, exercising, etc.

For example, if the genre of a music content reproduced by a user more than a predetermined number of times is "Hip Hop", the controller 270 may determine "Hip Hop" as a category regarding music contents to be included in a playlist. In another example, if the singer of a music content frequently searched by a user is "Big Bang", the controller 270 may determine "Big Bang" as a category regarding music contents to be included in a playlist. In another example, if a user's preferred time of release of music contents is "2010's", the controller 270 may determine 2010's as a category regarding music contents to be included in a playlist. In another example, if it is determined that a user frequently listens to energetic music, the controller 270 may determine "Energetic" as a category regarding the mood of music contents to be included in a playlist. In addition, if a user is currently at work based on the user's schedule information, the controller 270 may determine "Working" as a category regarding a user activity that may relate to music contents to be included in a playlist.

The controller 270 may control the display 210 to provide a playlist including a plurality of music contents based on the determined plurality of categories. Specifically, the controller 270 may search a plurality of music contents corresponding to a plurality of categories from among pre-stored music contents based on information regarding the determined plurality of categories, and control the display 210 to provide a playlist including the searched plurality of music contents. For example, if the determined categories are "Hip Hop" and "2010's", the controller 270 may control the display 210 to provide a playlist including music contents corresponding to "Hip Hop" or "2010's" from among the pre-stored music contents. In this case, if there are music contents corresponding to all of the plurality of categories, the controller 270 may recommend those music contents corresponding to all of the plurality of categories with a priority over the music contents corresponding to only one of the plurality of categories. For example, if the determined categories are "Hip Hop" and "2010's", the controller 270 may control the display 210 to provide music contents corresponding to "hip hop in the 2010's" with a priority.

In addition, the controller 270 may control the communicator 220 to transmit information regarding the determined plurality of categories to an external server. In this case, the external server may be a server of a content provider who provides music contents.

If an external server generates a playlist using information regarding a plurality of categories using the above-described method, the controller 270 may control the communicator 220 to receive the playlist received from the external server and control the display 210 to provide the received playlist.

In the above-described exemplary embodiment, user information is used to determine a category regarding music contents to be included in a playlist, but this is only an example. The category may be determined using other information. For example, the controller 270 may acquire circumstantial information and determine a category corresponding to the circumstantial information. In this case, the circumstantial information may include weather information, time information, brightness information, noise information, location information, etc. For example, if it is snowing, the controller 270 may determine "Calm" as a category of music contents to be added to a playlist. In another example, if a current time is 2 A.M., the controller 270 may determine "Classic" or "Ballad" as a category of music contents to be added to a playlist. In another example, if current brightness is higher than a predetermined value, the controller 270 may determine a category "Good" of the mood of music contents to be added to a playlist.

In the above exemplary embodiment, a playlist may be automatically provided according to a category of music contents, which is determined based on user information and/or circumstantial information, but this is only an example. A playlist may be provided by generating, adding, deleting, or modifying categories according to a user manipulation.

Specifically, if a plurality of categories are determined based on user information and circumstantial information, the controller 270 may control the display 210 to display a plurality of UI categories corresponding to the plurality of categories.

Figure 4A:
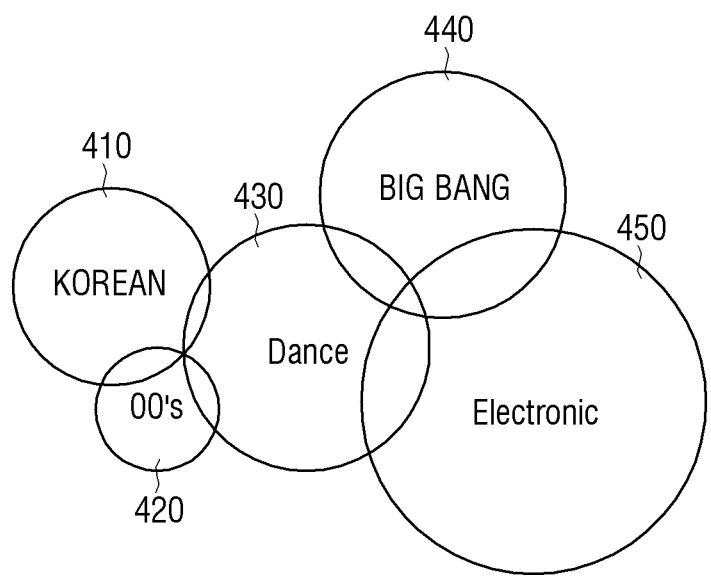
FIGS. 4A to 13 are views illustrating exemplary embodiments for playing a music content using a polyhedron UI according to various exemplary embodiments.

For example, as shown in FIG. 4A, if it is determined that the categories of music contents are "Korean song", "2000's", "Dance", "Big Bang", and "Electronic" according to user information, the controller 270 may control the display 210 to display a first circular UI element 410 corresponding to the category "Korean song", a second circular UI element 420 corresponding to the category "2000's", a third circular UI element 430 corresponding to the category "Dance", a fourth circular UI element 440 corresponding to the category "Big Bang", and a fifth circular UI element 450 corresponding to the category "Electronic". In this case, the size of the circular UI elements may be determined according to user preference. In other words, if the fifth circular UI element 450 has a biggest size as illustrated in FIG. 4A, it is indicated that the user preference for "Electronic" is the highest.

Figure 4B:
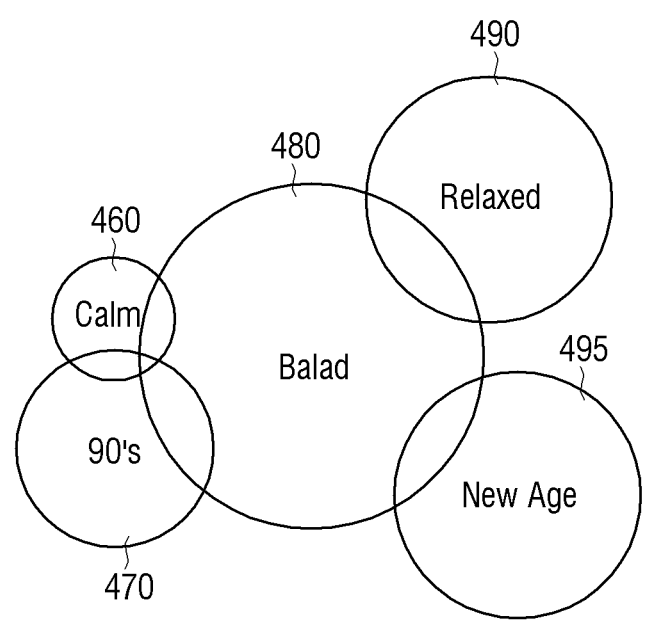

In another example, if it is determined that the categories are "Calm", "90's", "Ballad", "Relaxed", and "New Age" according to user information, the controller 270, as illustrated in FIG. 4B, may control the display 210 to display a fifth circular UI element 460 corresponding to the category "Calm", a seventh circular UI element 470 corresponding to the category "90's", an eighth circular UI element 480 corresponding to the category "Ballad", a ninth circular UI element 490 corresponding to the category "Relaxed", and a tenth circular UI element 495 corresponding to the category "New Age". In this case, the location of the circular UI elements may change according to user preference. In other words, if the eight circular UI element is at the center as illustrated in FIG. 4B, it is indicated that the user preference for "Ballad" is the highest.

In addition, a circular UI element corresponding to a category may be generated according to user information and/or circumstantial information, but this is only an example. A user may directly or indirectly designate a category to add a corresponding circular UI element.

Figure 5A:
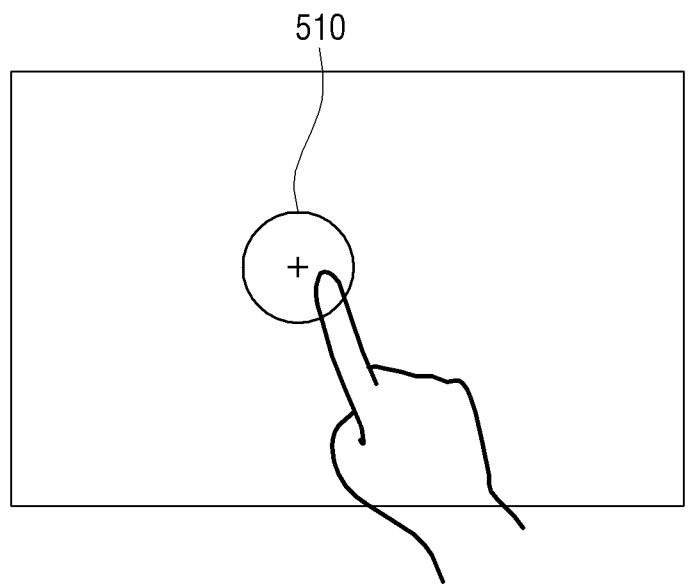
Figure 5B:
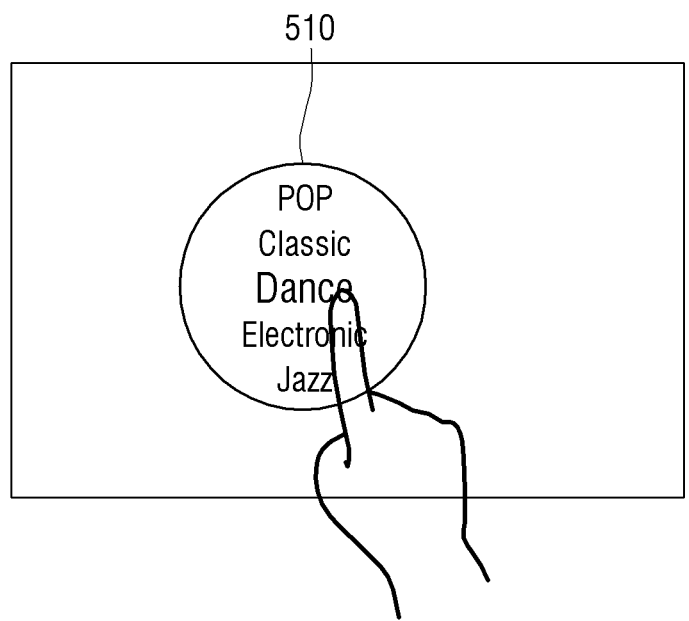

Specifically, as shown in FIG. 5A, if a predetermined user interaction (for example, a long-press interaction, etc.) is sensed at one point of a screen, the controller 270 may control the display 210 to display a first circular UI element 510 at the one point of the screen. As illustrated in FIG. 5B, the controller 270 may control the display 210 to display a list of categories within the first circular UI element 510. If a category "Dance" is selected from the list, the controller 270 may control the display 210 to display an indicator of "Dance" within the first circular UI element 510, as shown in FIG. 5C.

Figure 5C:
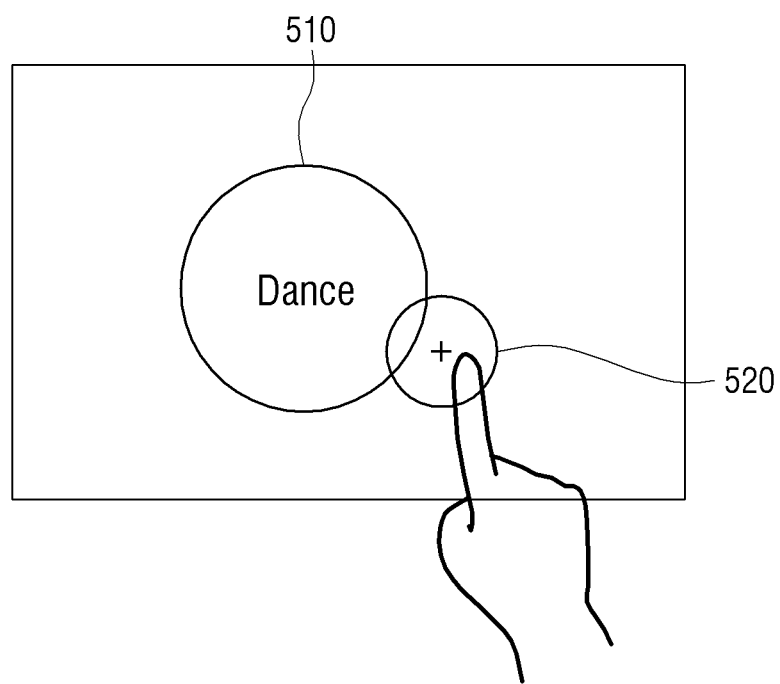
Figure 5D:
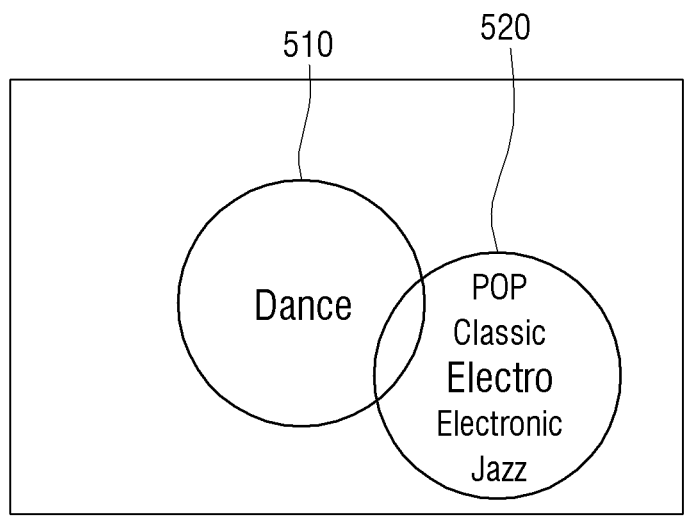
Figure 5E:
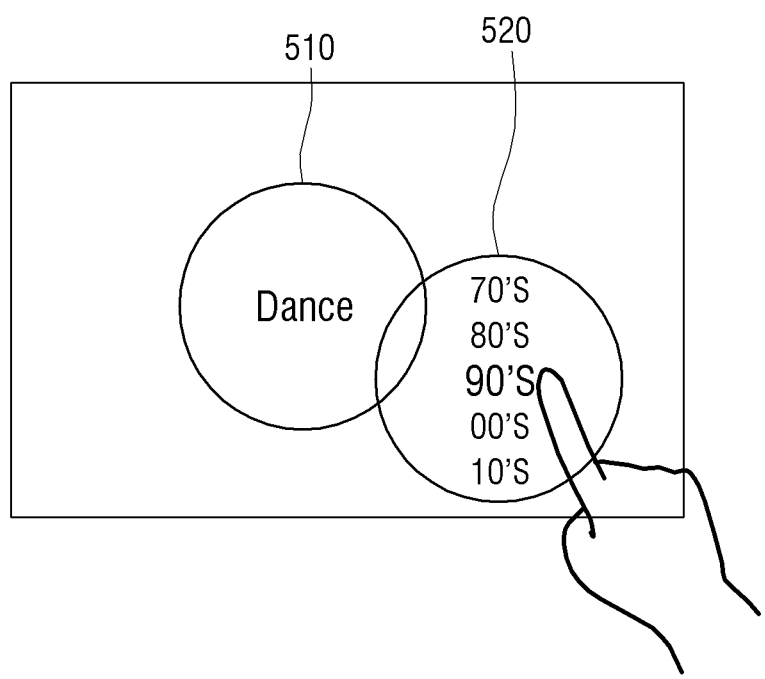
Figure 5F:
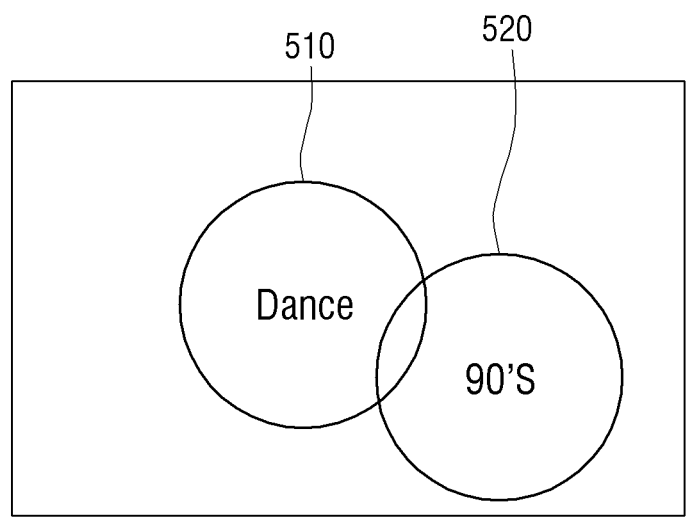

As shown in FIG. 5C, if the predetermined user interaction is sensed again at another point of the screen, the controller 270 may control the display 210 to display a second circular UI element 520 at the another point of the screen. As shown in FIG. 5D, the controller 270 may control the display 210 to display a list of genre categories within the second circular UI element 520. If a user interaction to select another type of a category is sensed, the controller 270 may control the display 210 to display a list of categories of another type, e.g., a time of release within the second circular UI element 520, as shown in FIG. 5E. If a category "90's" is selected from the list, the controller 270 may control the display 210 to display the indicator of "90's" within the second circular UI element 520, as shown in FIG. 5F.

Figure 6A:
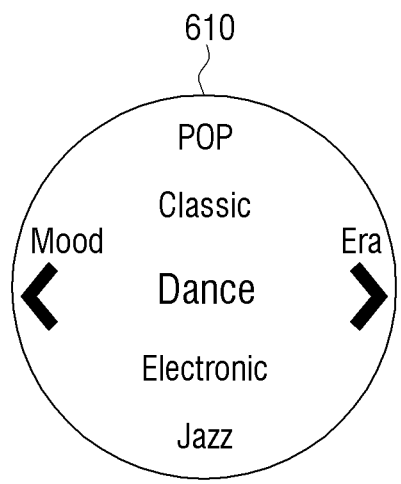

A method of selecting categories by using a list for selecting categories which is displayed within a circular UI element according to an exemplary embodiment will be described with reference to FIGS. 6A to 6C. Referring to FIG. 6A, the controller 270 may control the display 210 to display a list for selecting genre categories within a circular UI element 610. In this case, the controller 270 may control the display 210 to display a category "Dance" to be distinguishable from other genres. In FIG. 6A, the category "Dance" is displayed in a larger size bigger than other genres, but this is only an example. The category of "Dance" may be displayed to be distinguishable from other genres by using various methods such as highlighting a text "Dance".

Figure 6B:
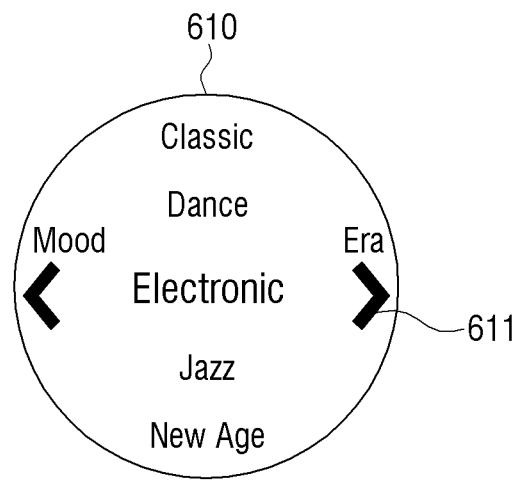

If a user interaction to move in the list in a downward direction (for example, a touch interaction of dragging in an upward direction, a button interaction of selecting a down button, etc.) is sensed, the controller 270 may control the display 210 to display a category "Electronic", which is another genre within the same "genre" category of the music content, to be distinguishable from other genres in the list, as illustrated in FIG. 6B. In this case, if a user interaction to select "Electronic" is sensed, the controller 270 may determine "Electronic" as the category for generating a playlist.

Figure 6C:
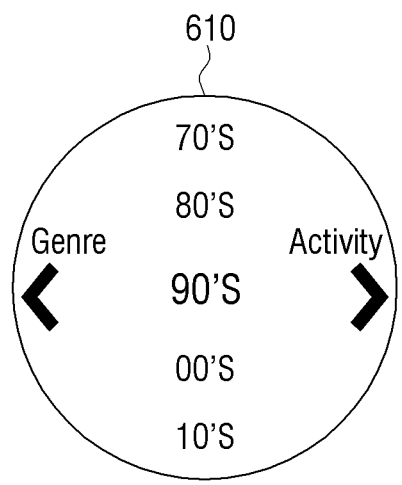

Alternatively, if a user interaction to select an arrow icon 611 in the circular UI element 610 (for example, a touch interaction of touching the arrow icon 611, an interaction of selecting a right button, etc.) is sensed, the controller 270 may control the display 210 to display a list regarding a different category of times of release, as illustrated in FIG. 6C.

In the above exemplary embodiment, a category is selected using a list, but this is only an example. A user may select a category without a list, e.g., by directly inputting a desired category.

In addition, the controller 270 may generate a category map by adjusting the size and the location of UI elements (e.g., circular UI elements) corresponding to categories according to various user interactions. In particular, the controller 270 may adjust the location of a UI element through a touch and drag interaction of touching a point of the UI element and dragging the touched point to another point. In addition, the controller 270 may adjust the size of a UI element through a pinch-out interaction of touching two points on the UI element and widening a distance between the touched two points or a pinch-in interaction of touching two points of the UI element and narrowing the distance between the touched two points.

Figure 7A:
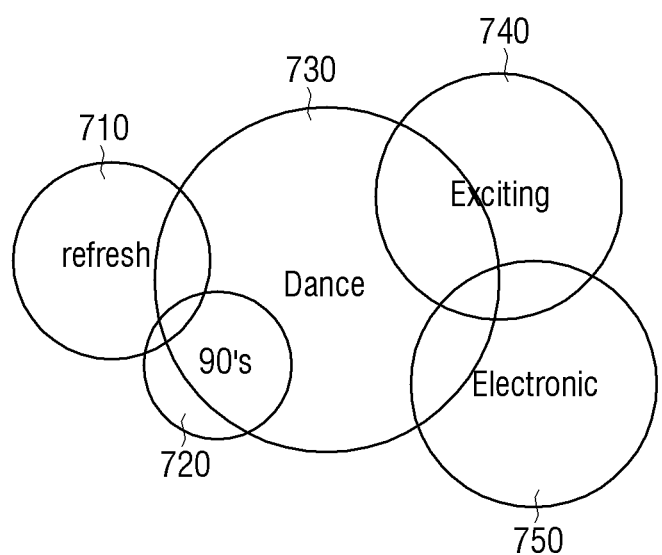
Figure 7B:
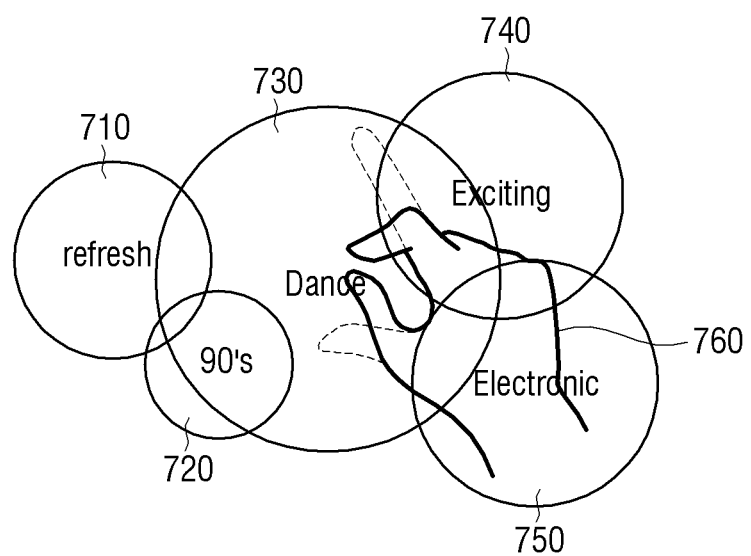
Figure 7C:
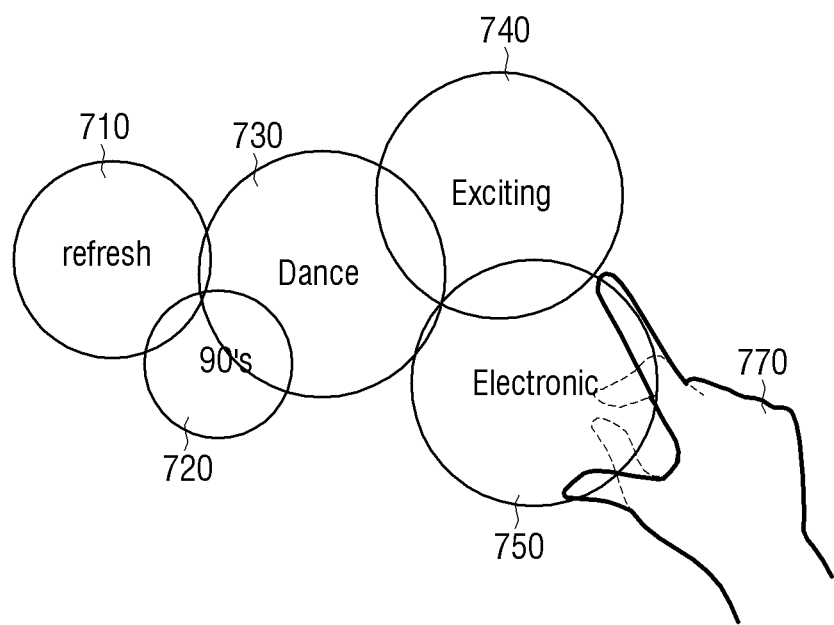
Figure 7D:
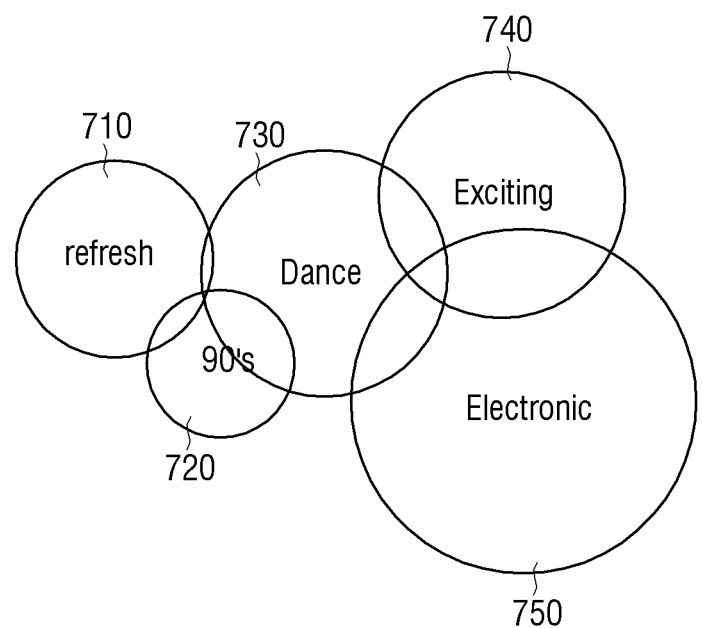

For example, referring to FIG. 7A, first to fifth circular UI elements 710, 720, 730, 740, and 750 are displayed, and a pinch-in interaction 760 of touching two points in the third circular UI element 730 and narrowing the distance between the two touched points may be sensed as illustrated in FIG. 7B. In this case, the controller 270, as illustrated in FIG. 7C, may control the display 210 to reduce the size of the third circular UI element 730. On the other hand, if a pinch-out interaction 770 of touching two points of the fifth circular UI element 750 and widening the distance between the two touched points may be sensed 770, as illustrated in FIG. 7C. In this case, the controller 270, as illustrated in FIG. 7D, may control the display 210 to enlarge the size of the fifth circular UI element 750.

Figure 8A:
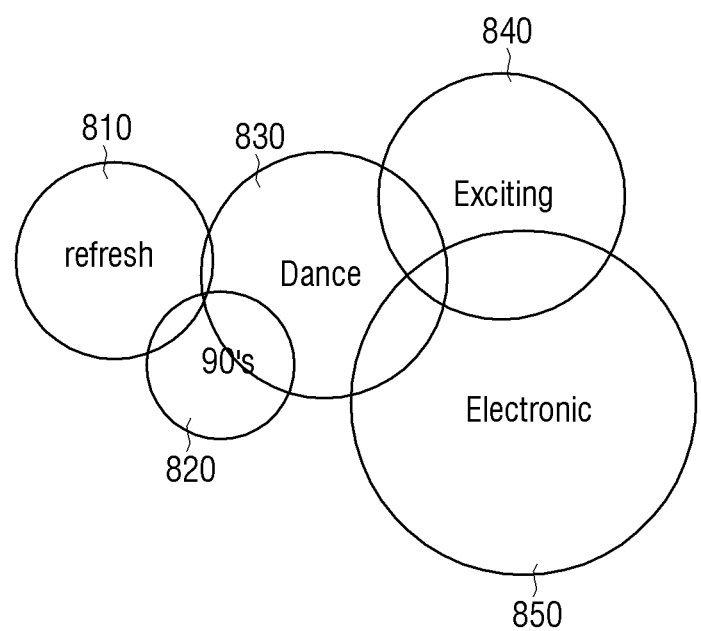
Figure 8B:
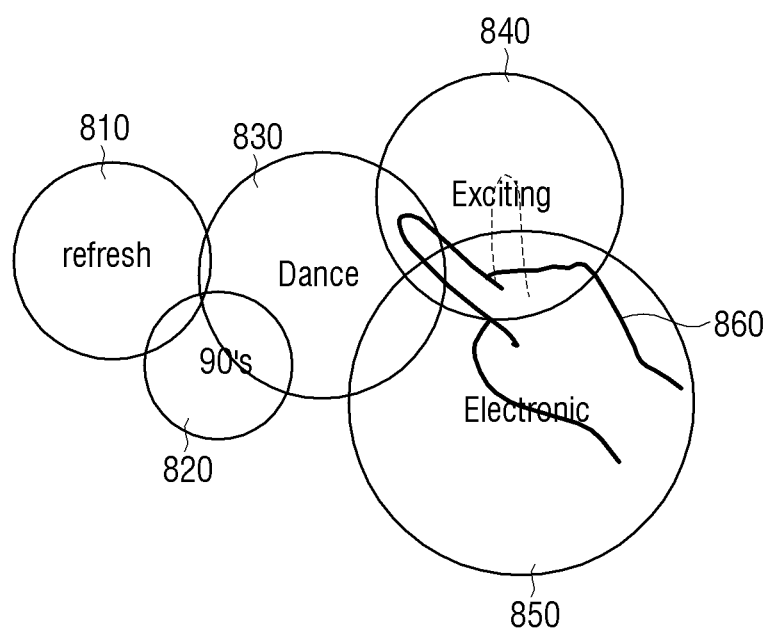
Figure 8C:
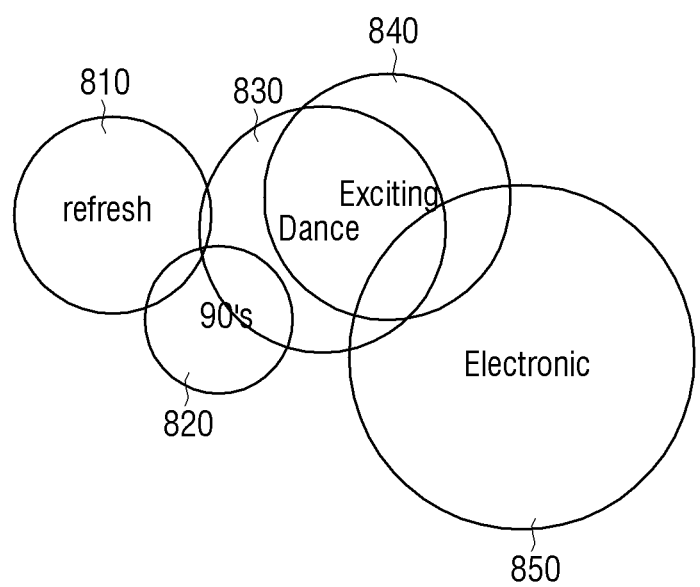

In addition, referring to FIG. 8A, first to fifth circular UI elements 810, 820, 830, 840, and 850) are displayed, and a drag interaction 860 of touching a point of the fourth circular UI element 840 and dragging the touched point in a direction of the third circular UI element 830 may be sensed as illustrated in FIG. 8B. In this case, the controller 270, as illustrated in FIG. 8C, may control the display 210 to move the location of the fourth circular UI element 840 to the direction of the third circular UI element 830.

As illustrated above with reference to FIGS. 7A to 8C, by adjusting the size and the location of the UI elements, a user may adjust the size of each UI element and the size of an area in which at least two circular UI elements are overlapped.

In addition, the controller 270 may determine a ratio between categories regarding music contents to be included in a playlist according to the size ratio of each of a plurality of UI elements included in a category map. In particular, if at least two UI elements from among a plurality of circular UI elements are overlapped, the controller 270 may determine the ratio of music contents which belong to all categories corresponding to at least two circular UI elements to correspond to the size ratio of the overlapped area.

Figure 9A:
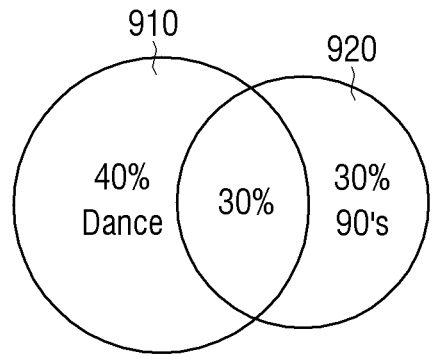

For example, as illustrated in FIG. 9A, if a first circular UI elements 910 corresponding to a category "Dance" and a second circular UI element 920 corresponding to a category "90's" are overlapped, and the size of the area occupied by only the first circular UI element 910 is 40%, the size of the area occupied by only the second circular UI element 920 is 30%, and the size of the area overlapped between the first circular UI element and the second circular UI element 910, 920 is 30%, the controller 270 may select music contents corresponding to "dance music not in the 90's" in the ratio of 40%, music contents corresponding to "music of the 90's which is not dance music" in the ratio of 30%, and music contents corresponding to "dance music in the 90's" in the ratio of 30%. In other words, if the number of music contents to be included in a playlist is 100, the controller 270 may select 40 music contents which belong to a category "dance music not in the 90's", 30 music contents which belong to a category "music of the 90's which is not dance music", and 30 music contents which belong to a category "dance music in the 90's".

Figure 9B:
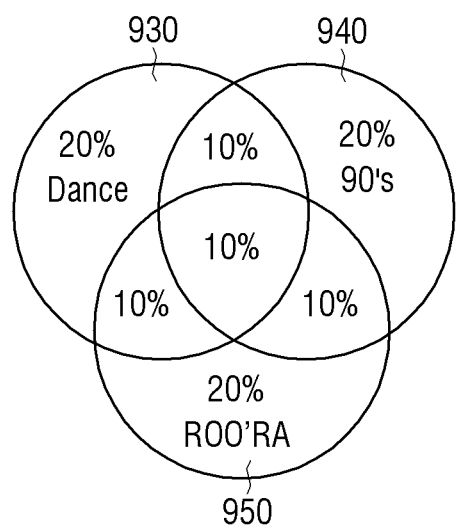

In another exemplary embodiment, as illustrated in FIG. 9B, a third circular UI element 930 corresponding to a category "Dance", a fourth circular UI element 940 corresponding to a category "90's", and a fifth circular UI element 950 corresponding to a category of an artist "Roo'ra" are overlapped, and the size of the area occupied by only the third circular UI element 930 is 20%, the size of the area occupied by only the fourth circular UI element 940 is 20%, the size of area occupied by only the fifth circular UI element 950 is 20%, the size of the area overlapped between the third circular UI element and the fourth circular UI element 930, 940 is 10%, the size of the area overlapped only between the third circular UI element and the fourth circular UI element 930, 940 is 10%, the size of the area overlapped only between the third circular UI element and the fifth circular UI element 930, 950 is 10%, the size of the area overlapped only between the fourth circular UI element and the fifth circular UI element 940, 950 is 10%, and the size of the area overlapped among the third to fifth circular UI elements 930 to 950 is 10%. In this case, the controller 270 may select "dance music which is not music of Roo'ra and not released in the 90's" in the ratio of 20%, music contents corresponding to "music of the 90's which is not music of Roo'ra and not dance music" in the ratio of 20%, music contents corresponding to "music of Roo'ra which is not dance music and not released in the 90's" in the ratio of 20%, music contents corresponding to "dance music of Roo'ra but not released in the 90's" in the ratio of 10%, music contents corresponding to "dance music which is not music of Roo'ra but released in the 90's" in the ratio of 10%, music contents corresponding to "music of Roo'ra which is not dance music but released in the 90's" in the ratio of 10%, and music contents corresponding to "dance music of Roo'ra which is released in the 90's" in the ratio of 10%.

The controller 270 may control the display 210 to provide a playlist by selecting a plurality of music contents according to the determined category ratio of music contents. According to another exemplary embodiment, the controller 270 may control the communicator 220 to transmit information regarding a category map to an external server, and control the communicator 220 to receive a playlist which is determined using the above-described method. In addition, the controller 270 may control the communicator 220 to provide the playlist received from the external server.

In the above-described exemplary embodiment, a circular UI element is generated or added according to user information, circumstantial information, or a user input, but this is only an example. A plurality of circular UI elements may be selected using any other method.

Figure 10A:
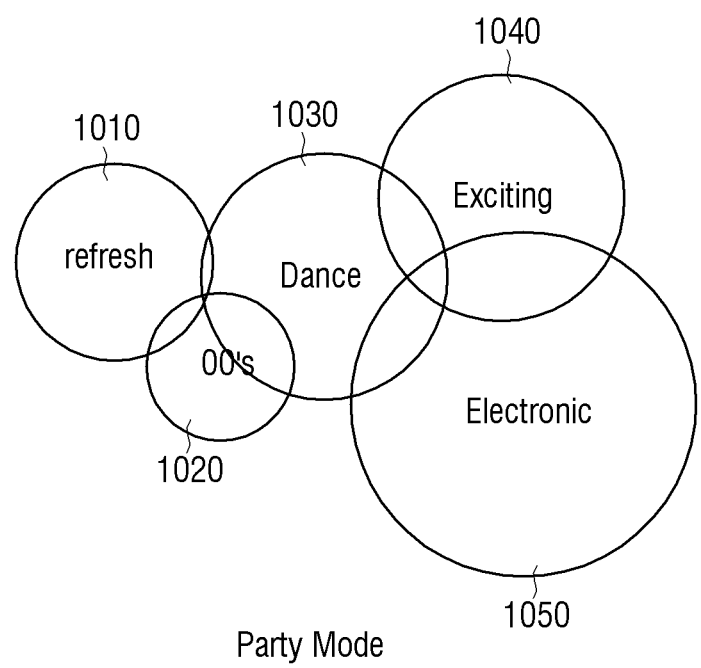
Figure 10B:
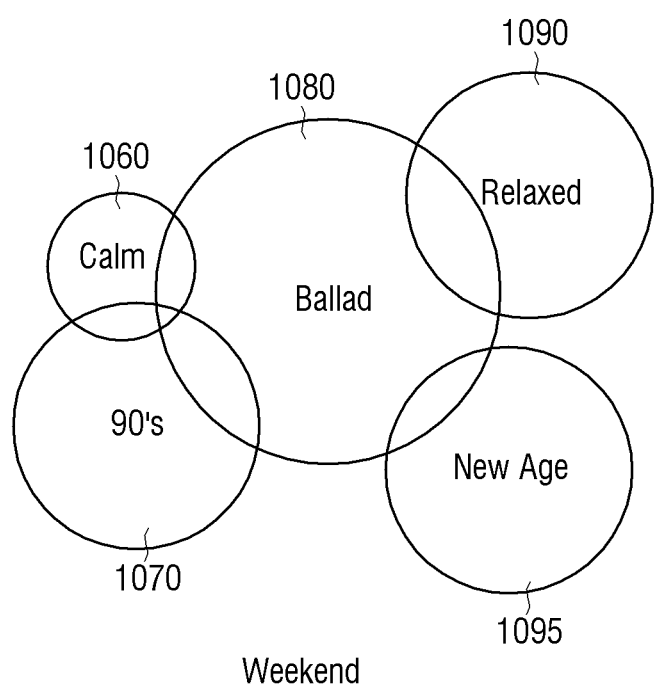

For example, the controller 270 may determine the type, location and size of a plurality of circular UI elements according to a mode selected by a user. For example, if a party mode is selected by a user, the controller 270 may generate a category map including a first circular UI element 1010 corresponding to the category of "Refresh", a second circular UI element 1020 corresponding to the category of "2000's", a third circular UI element 1030 corresponding to the category of "Dance", a fourth circular UI element 1040 corresponding to the category of "Exciting", and a fifth circular UI element 1050 corresponding to the category of "Electronic", as illustrated in FIG. 10A. In another example, if a weekend mode is selected by a user, the controller 270 may generate a category map including a sixth circular UI element 1060 corresponding to the category of "Calm", a seventh circular UI element 1070 corresponding to the category of "90's", an eighth circular UI element 1080 corresponding to the category of "Ballad", a ninth circular UI element 1090 corresponding to the category of "Relaxed", and a tenth circular UI element 1095 corresponding to the category of "New Age", as illustrated in FIG. 10B.

Figure 11:
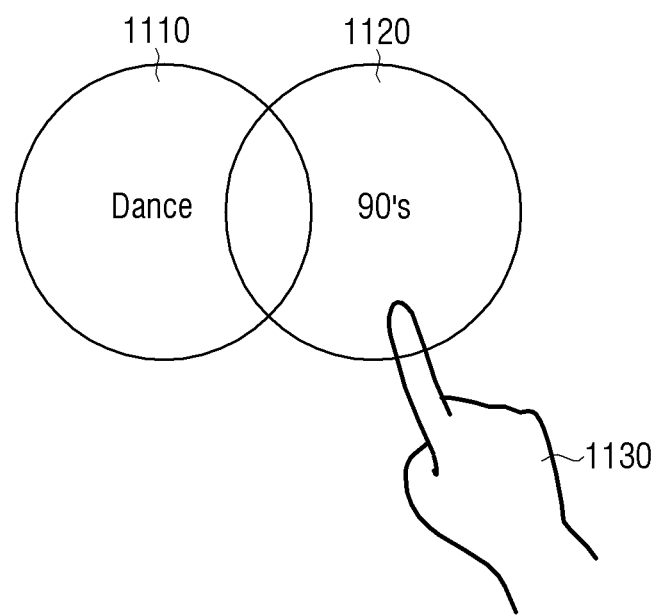

In addition, if a predetermined user interaction with respect to one area of a category map is sensed, the controller 270 may control the display 210 to provide a playlist based solely on category information corresponding to the one area. For example, as illustrated in FIG. 11, while a category map including a first circular UI element 1110 and a second circular UI element 1120 is displayed, if a predetermined user interaction (for example, a long-press interaction) is sensed with respect to the area occupied by only the second circular UI element 1120, the controller 270 may generate a playlist based on only music contents in the 90's which are not dance music.

In addition, if a user interaction to share a category map is sensed, the controller 270 may control the communicator 220 to transmit information regarding the category map to an external audio device. The external audio device may generate a playlist using the above-described method based on the information regarding the category map. In this case, the playlist which is generated based on the information regarding the category map may be determined differently from a playlist generated by an electronic device according to music contents stored in the external audio device, services supported by the external audio device or a sound source provider.

Figure 12:
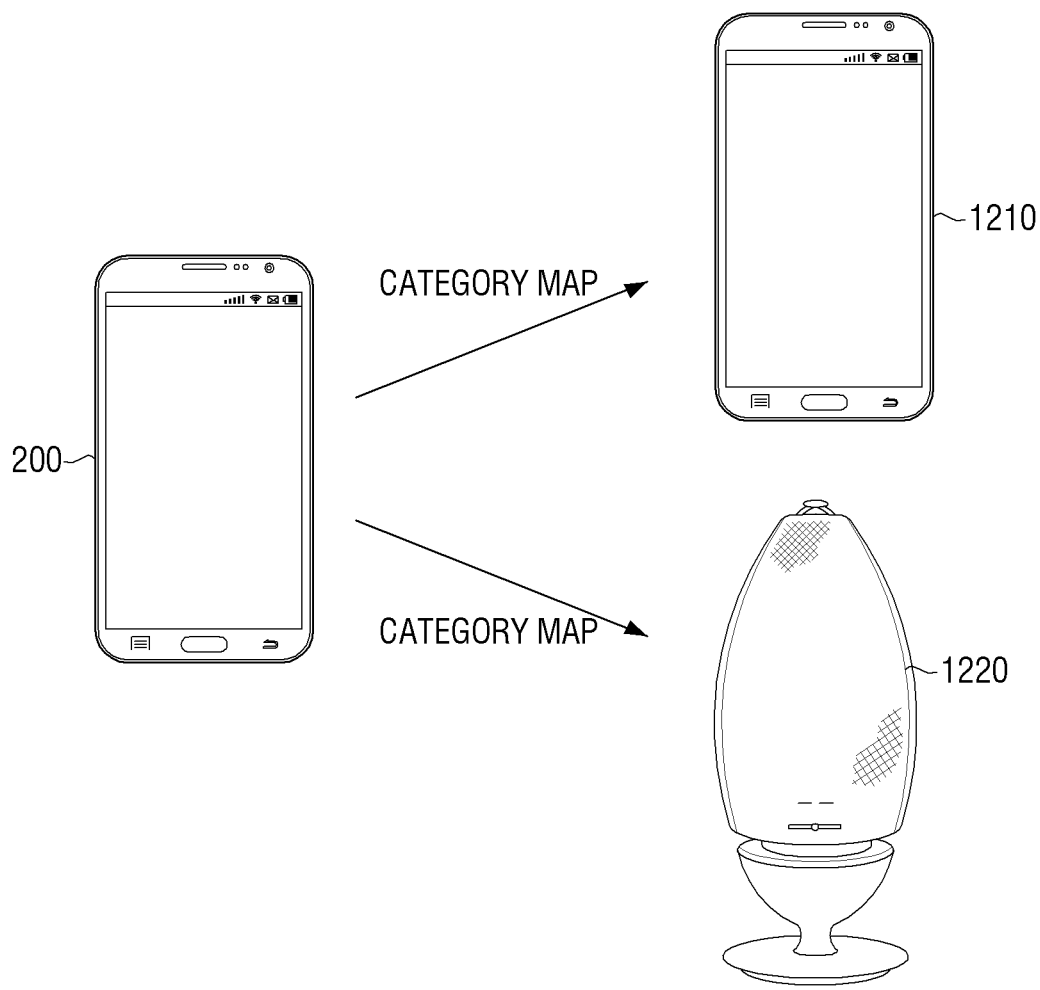

For example, as illustrated in FIG. 12, the electronic device 200 may transmit a category map to a first audio device 1210 and a second audio device 1220. In this case, the first audio device 1210 may be provided with music contents from a first content provider, and the second audio device 1220 may be provided with music contents from a second content provider. The first audio device 1210 may transmit information regarding the category map to the first content provide and receive a playlist, and the second audio device 1220 may transmit information regarding the category map to the second content provider and receive a playlist. In this case, the first audio device 1210 and the second audio device 1220 receive playlists from different content providers and thus, generate different playlists based on the same category map.

Figure 13:
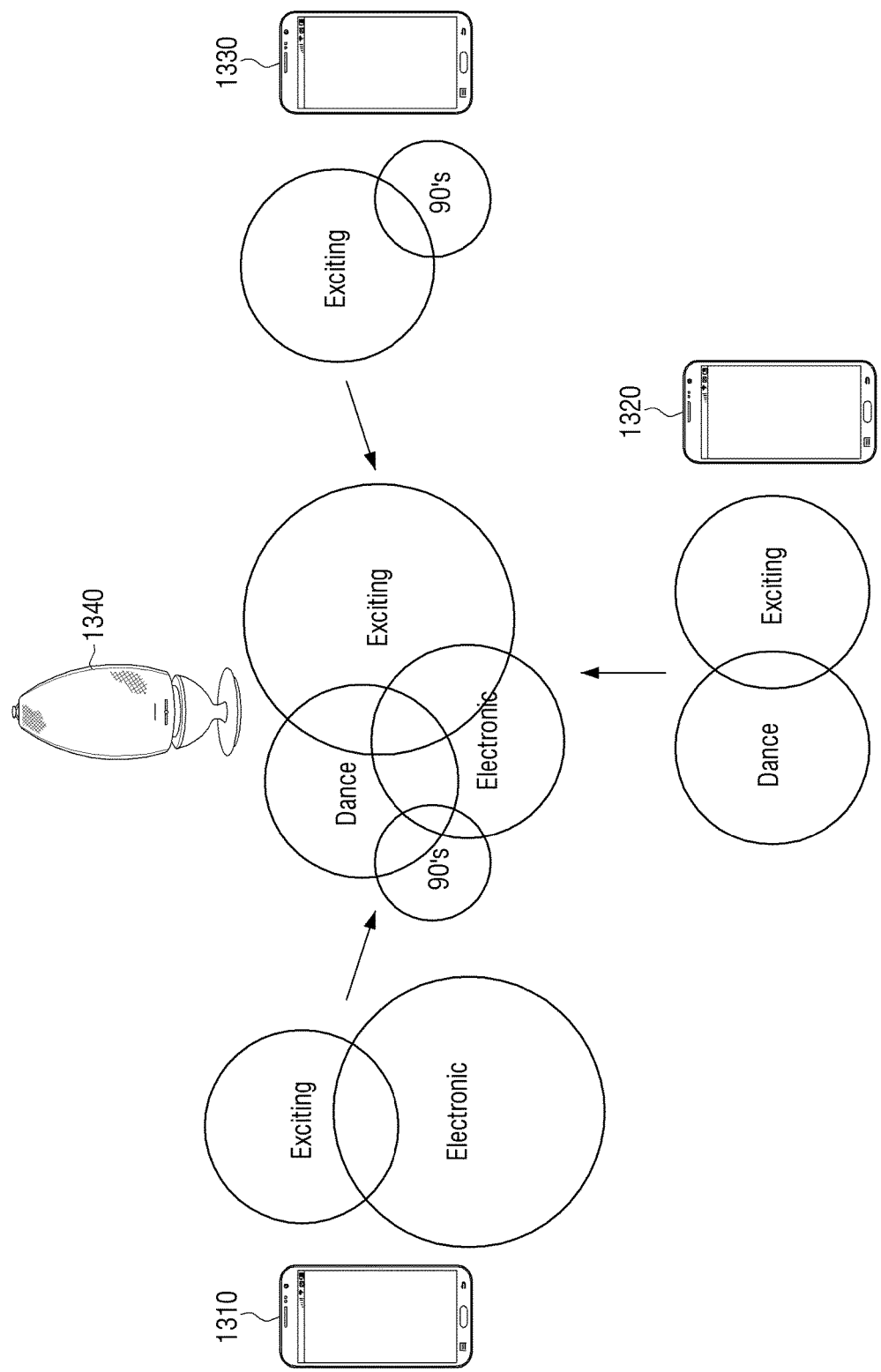

In addition, a plurality of electronic devices may generate a single category map by sharing respective category maps of the plurality of electronic devices. Specifically, as illustrated in FIG. 13, a first to a third electronic devices 1310 to 1330 may transmit a first to a third category maps to an audio device 1340. In this case, the audio device 1340 may generate a single category map using the category maps received from the plurality of electronic devices 1310 to 1330. In this case, a playlist may be generated by increasing the proportion of music contents that are selected based on the same category in the category map received from the plurality of electronic devices 1310 to 1330. For example, if there is the category of "Exciting" in the category maps of the first to the third electronic devices 1310 to 1330, the audio device 1340 may increase the proportion of music contents which belong to the category of "Exciting".

In the above exemplary embodiment, a playlist regarding music contents is generated, but this is only an example. A playlist regarding various contents such as image contents, broadcast contents, photo contents, etc. may be generated using the above-described method.

In addition, in the above exemplary embodiment, a category map is generated using a circular UI element, but this is only an example. A category map may be generated using a UI element in different forms (for example, a regular square, a regular triangle, an oval, etc.).

Figure 14:
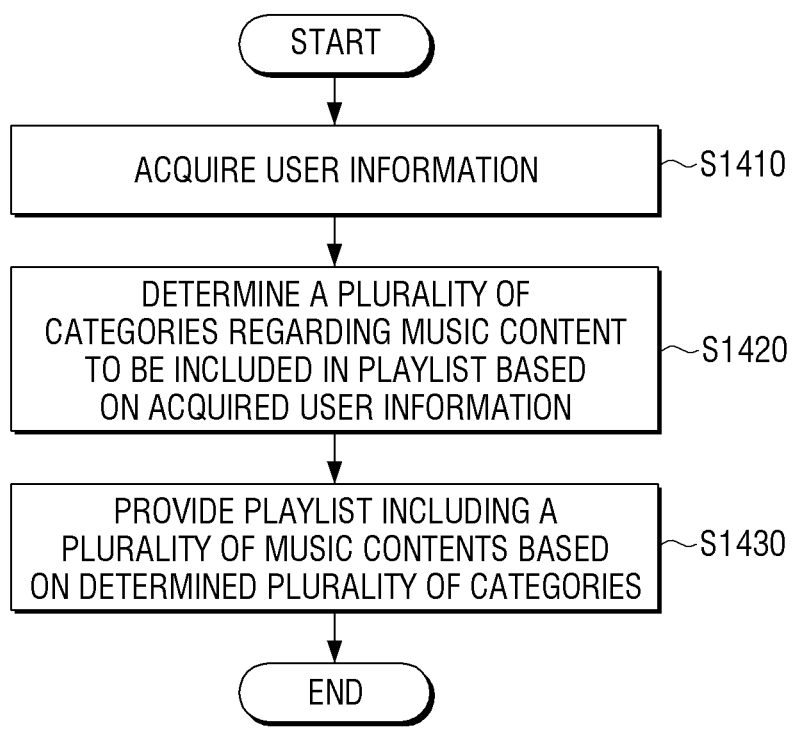
FIG. 14 is a flowchart illustrating a method for controlling an electronic device according to an exemplary embodiment.

Hereinafter, a method of controlling of an electronic device according to an exemplary embodiment will be described with reference to FIG. 14.

First, the electronic device 100 acquires user information (S1410). In this case, the user information may include various information such as information regarding music contents that the user hears frequently, user preference information which is input by the user, information regarding a keyword frequently used as a search query, the user's schedule information, etc. In this case, the electronic device 100 may acquire user information through stored various data, but this is only an example. The electronic device 100 may receive user information from an external server.

The electronic device 100 determines a plurality of categories regarding music contents to be included in a playlist based on the acquired user information (S1420). Specifically, the electronic device 100 may determine categories of music contents to be included in a playlist based on various user information, etc. For example, the categories may include at least one of genre, time of release, singer name, and mood of music contents.

The electronic device 100 generates and provides a playlist including a plurality of music contents based on the determined plurality of categories (S1430). Specifically, the electronic device 100 may automatically generate a playlist based on the determined plurality of categories, but this is only an example. The electronic device 100 may generate a playlist using a category map as described above with reference to FIGS. 4A to 13.

According to the above-described various exemplary embodiments, the electronic device 100 may automatically recommend a music content to a user by analyzing the user's music preferences. In addition, a user may share music contents according to his or her preference with other users through a category map.

Hereinafter, a method of generating a playlist based on preferred category information received by an audio device from outside according to an exemplary embodiment will be described with reference to FIGS. 15 to 17.

Figure 15:
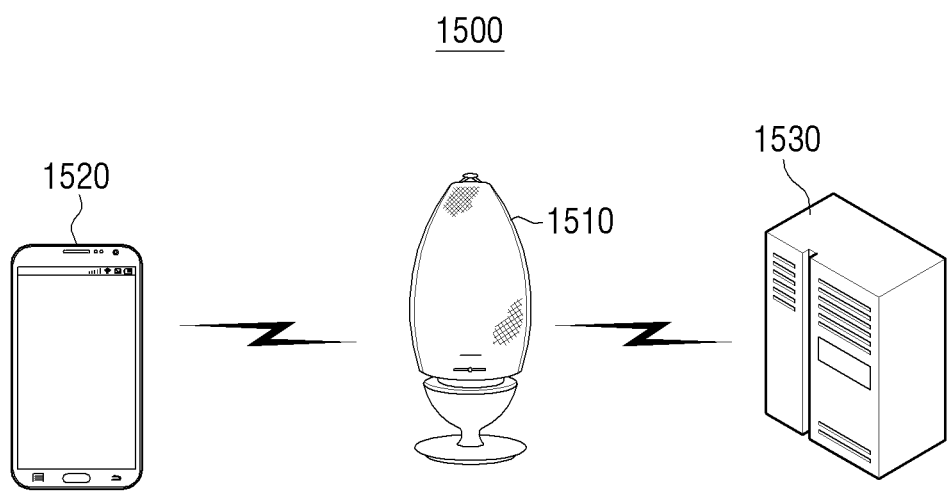
FIG. 15 is a view illustrating a content providing system according to an exemplary embodiment.

First, as illustrated in FIG. 15, a music content providing system 1500 includes an audio device 1510, a user terminal 1520 and a content providing server 1530. In this case, the audio device 1510 and the user terminal 1520 may be a speaker and a smart phone, respectively, but are not limited thereto.

The user terminal 1520 acquires user's preferred category information. In this case, the user terminal 1520 may acquire preferred category information which is directly or indirectly input by the user or acquire preferred category information based on usage history. In addition, the user terminal 1520 may generate a category map as preferred category information using the above described-method described with reference to FIGS. 4A to 11B.

The audio device 1510 may receive preferred category information from the user terminal 1520. The audio device 1510 may generate a playlist including a plurality of music contents based on the preferred category information. In this case, the audio device 1510 may extract a plurality of music contents by comparing the preferred category information and metadata of pre-stored music contents, and generate a playlist including the extracted music contents. In addition, the audio device 1510 may transmit the preferred category information to the external content providing server 1530 and receive a playlist generated based on the preferred category information. Further, the audio device 1510 may transmit preferred category information to a general user terminal instead of the external content providing server 1530 and request a playlist.

The audio device 1510 may play a plurality of music contents based on the generated playlist.

Figure 16:
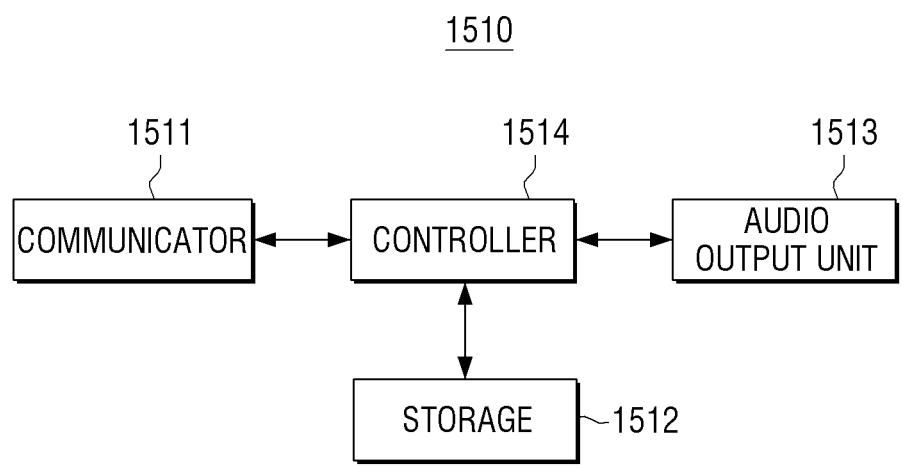
FIG. 16 is a block diagram illustrating a configuration of an audio device according to an exemplary embodiment.

FIG. 16 is a block diagram illustrating configuration of the audio device 1510 according to an exemplary embodiment. As illustrated in FIG. 16, the audio device 1510 includes a communicator 1511, a storage 1512, an audio output unit 1513, and a controller 1514.

In this case, the communicator 1511 performs communication with various external electronic devices. In particular, the communicator 1511 may receive preferred category information from the external user terminal 1520 and transmit the preferred category information to the external content providing server 1530.

The storage 1512 stores programs and data to control the audio device 1510. In addition, the storage 1512 may include a non-volatile memory which stores a plurality of music contents and include a volatile memory which temporarily stores music contents received from the external content providing server 130.

The audio output unit 1513 outputs audio data. In particular, the audio output unit 1513 may play a plurality of music contents included in a generated playlist.

The controller 1514 controls the overall operations of the audio device 1510. Specifically, the controller 1514 may acquire a user's preferred category information from the external user terminal 1520 through the communicator 1511, generate a playlist including a plurality of music contents based on the acquire preferred category information, and control the audio output unit 1513 to play music contents based on the generated playlist.

Specifically, the controller 1514 acquires user's preferred category information from the external user terminal 1520. In this case, the preferred category information may include information regarding the genre, singer, time of release, mood, etc. of the user's preferred music contents. In addition, the preferred category information may be information regarding the above-mentioned category map.

The controller 1514 may generate a playlist including a plurality of music contents based on the received preferred category information. Specifically, the controller 1514 may generate a playlist by extracting music contents corresponding to the preferred category information from among a plurality of music contents which are stored in the storage 1512. In addition, the controller 1514 may control the communicator 1511 to transmit the preferred category information to the external content providing server 1530 and receive a playlist including music contents corresponding to the preferred category from the content providing server 1530. In this case, the method of calculating the ratio of music contents corresponding to the preference category may be the same as the above-described method of calculating the ratio of music contents included in a playlist through category map.

The controller 1514 may control the audio output unit 1513 to play a plurality of music contents included in a received playlist. In this case, the controller 1514 may play music contents in the order of the music contents included in the playlist, but this is only an example. The controller 1514 may play the music contents in an arbitrary order or in a certain order according to a user setting.

Figure 17:
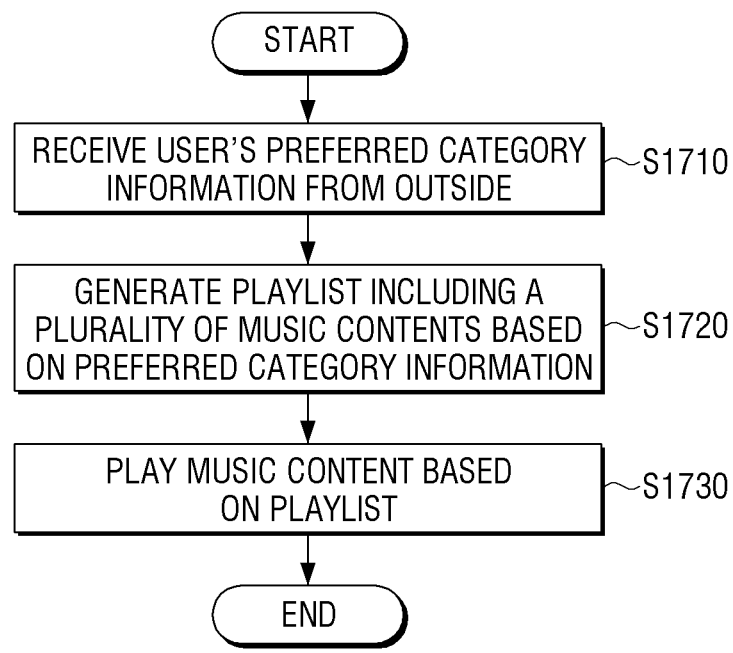
FIG. 17 is a flowchart illustrating a method for controlling an audio device according to an exemplary embodiment.

FIG. 17 is a flowchart provided to explain a method for controlling an audio device according to an exemplary embodiment.

First, the audio device 1510 receives a user's preferred category information from outside (S1710). Specifically, the audio device 1510 may receive preferred category information which is directly input from the user through the external user terminal 1520 or preferred category information which is determined through usage history of the user terminal 1520.

The audio device 1510 generates a playlist including a plurality of music contents based on the preferred category information (S1720). Specifically, the audio device 1510 may generate a playlist by extracting music contents corresponding to preferred category information from pre-stored music contents or receive a playlist corresponding to preferred category information from the external content providing server 1530.

The audio device 1510 play music contents based on the playlist (S1730).

According to the above-described exemplary embodiment, a playlist may be generated simply by receiving a user's preferred category information without receiving a separate playlist at a speaker and thus, a user may enjoy his or her preferred music contents using preferred category information without a need to select or designate, one by one, music contents to be added to the playlist.

A device (for example, modules or the electronic device 200) or a method (for example, operations) according to various exemplary embodiments may be performed, for example, by at least one computer (for example, a processor) which executes instructions included in at least one program from among programs which are maintained in a computer-readable storage media.

If the instructions are executed by a computer (for example, a processor), the at least one computer may perform a function corresponding to the instructions. In this case, the computer-readable storage media may, for example, be the memory 230.

The programs may be stored in a computer-readable storage media such as a hard disk, a floppy disk, a magnetic media (for example, magnetic tape), an optical media (for example, a compact disc read only memory (CD-ROM), a digital versatile disc (DVD), a magneto-optical media (for example, a floptical disk), a hardware device (for example, a read only memory (ROM), a random access memory (RAM) or a flash memory, etc.). In this case, the storage media is included as part of the electronic device 200, but may be mounted through a port of the electronic device 200 or may be included in an external device (for example, cloud, server or another electronic device) outside the electronic device 200. In addition, the programs may be divided and stored in a plurality of storage media. In this case, at least a part of the plurality of storage media may be provided in an external device of the electronic device 200.

The instructions may include machine language codes generated by a compiler, and high-level language codes that can be executed by a computer by using an interpreter. The above-described hardware device may be configured to operate as one or more software modules to perform the operations according to various exemplary embodiments, and vice versa.

According to the above-described various exemplary embodiments, an electronic device may analyze a user's music preference automatically and recommend a music content to a user. In addition, the user may share a music content of his or her style with other users through a category map.

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A method of controlling an electronic device, the electronic device comprising a display, a sensor configured to sense a user interaction, a communicator, and a controller, the method comprising:

displaying a plurality of user interface (UI) elements respectively corresponding to a plurality of categories regarding a music content;

in response to a user interaction regarding at least one UI element among the plurality of UI elements, acquiring music information based on at least one of a location and a size of the at least one UI element according to the user interaction, wherein the music information includes information about the plurality of categories regarding the music content; and providing a playlist comprising a plurality of music contents based on the information about the plurality of categories regarding the music content, wherein a ratio of a music content of a category to the plurality of music contents included in the playlist is determined based on a ratio of a size of a UI element corresponding to the category to a size of the plurality of UI elements, and wherein, in response to at least two UI elements from among the plurality of UI elements being overlapped with each other, a ratio of a music content which belongs to all of categories corresponding to the at least two UI elements to the plurality of music contents in the playlist is determined based on a ratio of a size of an area that is overlapped between the at least two UI elements to a size of an entire area of the plurality of UI elements.

2. The method as claimed in claim 1, wherein the acquiring the music information comprises determining the at least one of the location and the size of the at least one UI element, and the determining the at least one of the location and the size of the at least one UI element comprises:
adjusting the location of the at least one UI element in response to a first type of a touch operation of a user on the at least one UI element; and
adjusting the size of the at least one UI element in response to a second type of the touch operation of the user on the at least one UI element.

3. The method as claimed in claim 2, wherein the first type of the touch operation is a touch and drag operation and the adjusting the location comprises adjusting the location of the at least one UI element to a point at which the touch and drag operation is completed.

4. The method as claimed in claim 2, wherein the second type of the touch operation is a pinch in operation or a pinch out operation and the adjusting the size comprises decreasing the size of the at least one UI element in response to the pinch in operation and increasing the size of the at least one UI element in response to the pinch out operation.

5. The method as claimed in claim 1, wherein the providing further comprises:
transmitting the music information to an external server;
receiving, from the external server, the playlist which is generated based on the music information; and
providing the received playlist.

6. The method as claimed in claim 1, wherein the providing further comprises:
transmitting the music information to an external audio device,
receiving, from the external audio device, the playlist which is generated based on the music information; and
providing the received playlist.

7. The method as claimed in claim 6, wherein the playlist which is received from the external audio device is varied according to a service or a sound source provider supported by the external audio device.

8. The method as claimed in claim 1, wherein the providing further comprises, in response to a predetermined user interaction regarding the at least one UI element, determining at least one category among the plurality of categories based on the at least one UI element.

9. The method as claimed in claim 1, further comprising:
acquiring circumstantial information on a circumstance around the electronic device,
generating the plurality of categories regarding the music content further based on the circumstantial information.

10. The method as claimed in claim 1, further comprising:
receiving a user command to determine the category,
generating the plurality of categories regarding the music content further based on the received user command.

11. The method as claimed in claim 1, wherein the at least one UI element has a shape of a circle or a polygon.

12. An electronic device, comprising:
a display;
a sensor configured to sense a user interaction;
a communicator; and
a controller configured to:
control the display to display a plurality of user interface (UI) elements respectively corresponding to a plurality of categories regarding a music content;
in response to a user interaction regarding at least one UI element among the plurality of UI elements, acquire music information based on at least one of a location and a size of the at least one UI element according to the user interaction, wherein the music information includes information about the plurality of categories regarding the music content; and
provide a playlist comprising a plurality of music contents based on the information about the plurality of categories regarding the music content,
wherein a ratio of a music content of a category to the plurality of music contents included in the playlist is determined based on a ratio of a size of a UI element corresponding to the category to a size of the plurality of UI elements, and
wherein, in response to at least two UI elements from among the plurality of UI elements being overlapped with each other, a ratio of a music content which belongs to all of categories corresponding to the at least two UI elements to the plurality of music contents in the playlist is determined based on a ratio of a size of an area that is overlapped between the at least two UI elements to a size of an entire area of the plurality of UI elements.

13. The electronic device as claimed in claim 12, wherein the controller is further configured to adjust the location of the at least one UI element in response to a first type of a touch operation of a user on the at least one UI element and adjust the size of the at least one UI element in response to a second type of the touch operation of the user on the at least one UI element.

14. The electronic device as claimed in claim 13, wherein the first type of the touch operation is a touch and drag operation and the controller is further configured to adjust the location of the at least one UI element to a point at which the touch and drag operation is completed.

15. The electronic device as claimed in claim 13, wherein the second type of the touch operation is a pinch in operation or a pinch out operation and the controller is further configured to decrease the size of the at least one UI element in response to the pinch in operation and increase the size of the at least one UI element in response to the pinch out operation.

16. The electronic device as claimed in claim 12,
wherein the communicator is configured to perform communication with an external server, and
wherein the controller is further configured to control the communicator to transmit the music information to the external server and receive the playlist which is generated based on the music information from the external server, and control the display to provide the received playlist.

* * * * *